United States Patent
Srivastava et al.

(10) Patent No.: US 11,218,771 B2
(45) Date of Patent: *Jan. 4, 2022

(54) CALIBRATION SYSTEM FOR AUDIENCE RESPONSE CAPTURE AND ANALYSIS OF MEDIA CONTENT

(71) Applicant: SONY CORPORATION, Tokyo (JP)

(72) Inventors: Anubhav Srivastava, Bangalore (IN); Venkatesh Dharamukkala, Bangalore (IN)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/715,733

(22) Filed: Dec. 16, 2019

(65) Prior Publication Data
US 2020/0120389 A1    Apr. 16, 2020

Related U.S. Application Data

(63) Continuation of application No. 15/921,244, filed on Mar. 14, 2018, now Pat. No. 10,511,888.
(Continued)

(51) Int. Cl.
*H04N 21/466*     (2011.01)
*H04N 21/8547*    (2011.01)
(Continued)

(52) U.S. Cl.
CPC ......... *H04N 21/4667* (2013.01); *G11B 27/28* (2013.01); *H04H 60/33* (2013.01);
(Continued)

(58) Field of Classification Search
CPC ........... H04N 21/252; H04N 21/42201; H04N 21/42203; H04N 21/4223;
(Continued)

(56) References Cited

U.S. PATENT DOCUMENTS 7,555,766 B2    6/2009  Kondo et al.
8,327,395 B2    12/2012 Lee et al.
(Continued)

FOREIGN PATENT DOCUMENTS

CN    101543086 A    9/2009
CN    101990451 A    3/2011
(Continued)

OTHER PUBLICATIONS

Non-Final Office Action for U.S. Appl. No. 15/921,244, dated Sep. 5, 2018, 09 pages.
(Continued)

*Primary Examiner* — Nicholas T Corbo
(74) *Attorney, Agent, or Firm* — Chip Law Group

(57) ABSTRACT

A calibration system for media content comprises a memory, a media device, a plurality of different types of sensors, and a control circuitry. The memory is configured to store a media item and expected-emotions-tagging metadata for the media item. The control circuitry is configured to compute a reaction delay for a first emotional response of the audience captured by the plurality of different types of sensors for a first scene of the media item with respect to a position of the first marker. The first scene of the media item spans a first time slot that corresponds to the first scene in the media item. The control circuitry is configured to calibrate the position of the first marker to associate a first set of frames of the first scene with the first emotional response, based on at least the computed reaction delay.

24 Claims, 16 Drawing Sheets

Related U.S. Application Data

(60) Provisional application No. 62/560,460, filed on Sep. 19, 2017.

(51) Int. Cl.
| | |
|---|---|
| *H04N 21/442* | (2011.01) |
| *H04H 60/33* | (2008.01) |
| *H04H 60/37* | (2008.01) |
| *H04H 60/65* | (2008.01) |
| *H04N 21/25* | (2011.01) |
| *H04N 21/422* | (2011.01) |
| *H04N 21/4223* | (2011.01) |
| *G11B 27/28* | (2006.01) |

(52) U.S. Cl.
CPC ............ *H04H 60/37* (2013.01); *H04H 60/65* (2013.01); *H04N 21/252* (2013.01); *H04N 21/4223* (2013.01); *H04N 21/42201* (2013.01); *H04N 21/42203* (2013.01); *H04N 21/44213* (2013.01); *H04N 21/44218* (2013.01); *H04N 21/8547* (2013.01)

(58) Field of Classification Search
CPC ......... H04N 21/44218; H04N 21/4667; H04N 21/8547; H04H 60/33; H04H 60/37; H04H 60/65; G11B 27/28
See application file for complete search history.

(56) References Cited

U.S. PATENT DOCUMENTS

| | | |
|---|---|---|
| 8,769,557 B1 | 7/2014 | Terrazas |
| 9,443,144 B2 | 9/2016 | Lucey et al. |
| 9,525,912 B1 | 12/2016 | Israelian et al. |
| 2007/0033634 A1 | 2/2007 | Leurs et al. |
| 2007/0214471 A1 | 9/2007 | Rosenberg |
| 2010/0211966 A1 | 8/2010 | Zhang et al. |
| 2012/0050482 A1 | 3/2012 | Boross |
| 2012/0189273 A1 | 7/2012 | Folgner et al. |
| 2012/0324491 A1 | 12/2012 | Bathiche et al. |
| 2013/0339433 A1 | 12/2013 | Li et al. |
| 2014/0086554 A1 | 3/2014 | Yehezkel et al. |
| 2014/0108309 A1 | 4/2014 | Frank et al. |
| 2014/0181668 A1 | 6/2014 | Kritt et al. |
| 2014/0282661 A1 | 9/2014 | Martin et al. |
| 2015/0052246 A1 | 2/2015 | Kordasiewicz et al. |
| 2015/0110471 A1 | 4/2015 | Zheng |
| 2017/0134803 A1 | 5/2017 | Shaw et al. |

FOREIGN PATENT DOCUMENTS

| | | |
|---|---|---|
| CN | 102073636 A | 5/2011 |
| CN | 102318246 A | 1/2012 |
| CN | 102902756 A | 1/2013 |
| CN | 102906818 A | 1/2013 |
| CN | 103609128 A | 2/2014 |
| CN | 103826160 A | 5/2014 |
| CN | 104320670 A | 1/2015 |
| CN | 104837036 A | 8/2015 |
| CN | 106791958 A | 5/2017 |
| EP | 2721831 A2 | 4/2014 |
| JP | 2008-205861 A | 9/2008 |
| JP | 2014-524178 A | 9/2014 |
| KR | 10-2014-0045412 A | 4/2014 |
| TW | 201301891 A | 1/2013 |
| WO | 2008/102533 A1 | 8/2008 |
| WO | 2012/174381 A2 | 12/2012 |
| WO | WO-2016137728 W | 9/2016 |

OTHER PUBLICATIONS

Final Office Action for U.S. Appl. No. 15/921,244, dated Mar. 18, 2019, 10 pages.
Advisory Action for U.S. Appl. No. 15/921,244, dated Jun. 12, 2019, 02 pages.
Notice of Allowance for U.S. Appl. No. 15/921,244, dated Aug. 7, 2019, 08 pages.
International Search Report and Written Opinion of PCT Application No. PCT/IB2018/056897, dated Nov. 12, 2018, 09 pages of ISRWO.
Bill Earl, "Calibrating Sensors", Adafruit Industries, URL: https://web.archive.org/web/20150922110125/https://learn.adafruit.com/downloads/pdf/calibrating-sensors.pdf, Sep. 22, 2015, 28 pages.
"Affectiva Facial Expression Analysis Engine", Anonymous, URL: https://developer.affectiva.com/metrics/, URL: https://imotions.com/affectiva/, imotions, 2013, 02 pages.

CALIBRATION SYSTEM FOR AUDIENCE RESPONSE CAPTURE AND ANALYSIS OF MEDIA CONTENT

CROSS-REFERENCE TO RELATED APPLICATIONS/INCORPORATION BY REFERENCE

The present application is a continuation application of U.S. patent application Ser. No. 15/921,244, filed on Mar. 14, 2018, which claims the benefit of priority from prior U.S. Provisional Patent Application Ser. No. 62/560,460 filed on Sep. 19, 2017. Each of the above-referenced applications is hereby incorporated herein by reference in its entirety.

FIELD

Various embodiments of the disclosure relate to multimedia and audience data based calibration technologies. More specifically, various embodiments of the disclosure relate to a calibration system and method for audience response capture and analysis of media content.

BACKGROUND

Recent advancements in the field of multimedia technology have led to development of various methods and techniques to encode various types of metadata (such as subtitles, commentary, citations, or emotion tags) in media content (such as a movie, a game, or other audio-video content). In a conventional system, a user may tag media content with emotion tags at various timestamps of the media content. The user may manually tag the media content at various timestamps based on input received from a production team (e.g., directors, cinematographers, composers, creators, and editors) of the media content. The production team may identify certain portions of the media content as interesting points using the manually tagged emotional tags in the media content. The production team may use the interesting points of the media content to generate a preview of media content (such as a movie trailer or a game trailer of the media content). In certain scenarios, the user may tag the media item at erroneous timestamps. In such scenarios, the interesting points of the media content, identified by the production team, may be erroneous. Further, interesting points that are assumed to elicit a certain emotional response may differ from the actual response received from an audience.

In certain scenarios, gauging an audience response in real time may find application in media or gaming industry, where the success of the media content is driven by how much the audience felt connected or engaged with the consumed media content. Currently, methods used to gauge an audience response are survey based, where a certain audience may be selected and their response may be collected manually or using certain devices, such as a camera. However, there are many challenges associated with manual or automated gauging of the audience response. For example, the audience may continue to respond (or elicit a same emotion) to a scene after the scene is already viewed. This may cause inaccurate estimation of an audience response for a subsequent scene.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A calibration system and method for audience response capture and analysis of media content is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
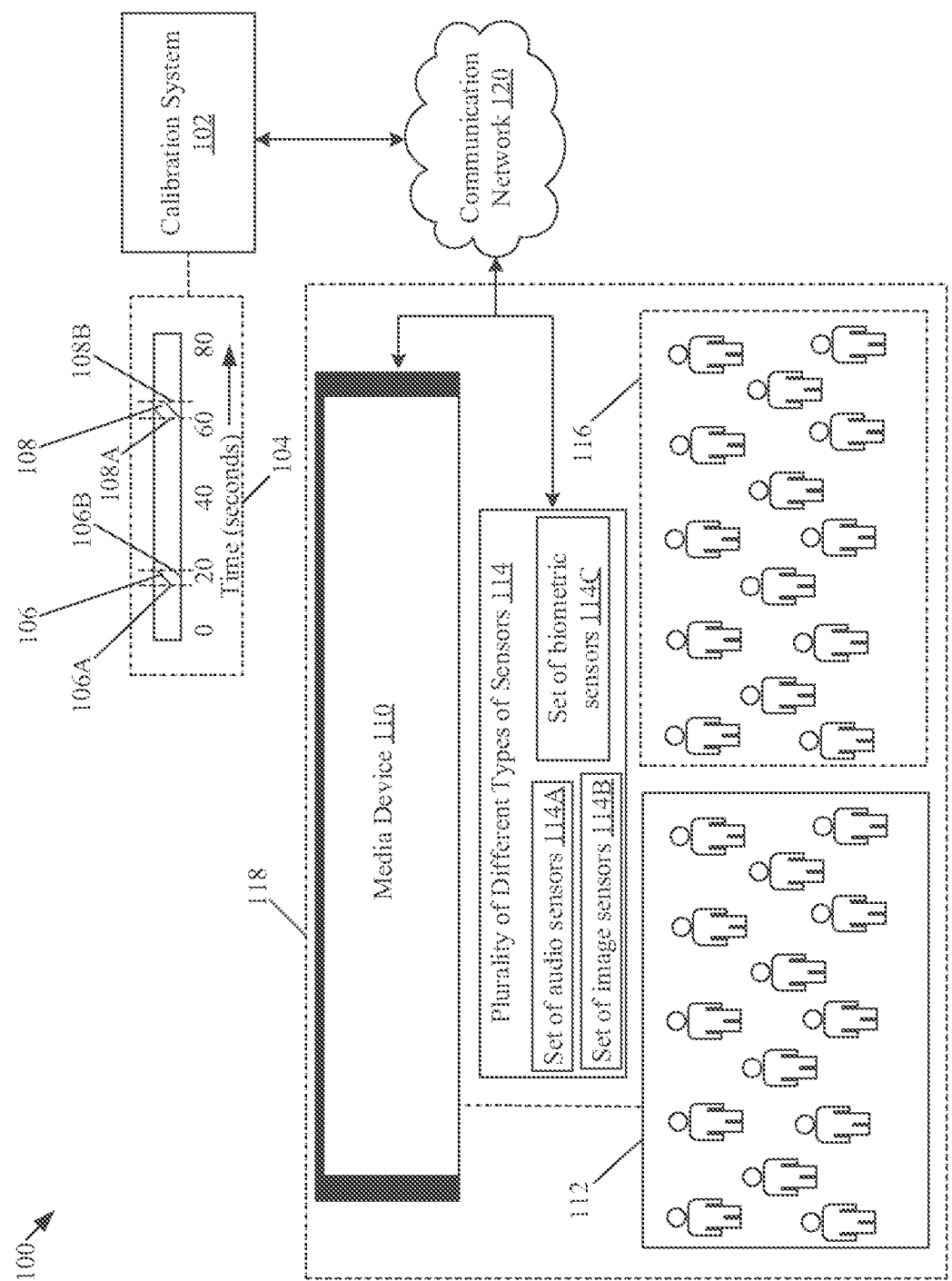
FIG. 1 is a block diagram that illustrates an exemplary network environment for a calibration system for audience response capture and analysis of media content, in accordance with an embodiment of the disclosure.

The following described implementations may be found in a disclosed calibration system for media content. Exemplary aspects of the disclosure may include the calibration system, which may further include a memory configured to store a media item and expected-emotions-tagging metadata for the media item. The expected-emotions-tagging metadata may indicate an associative relationship between a set of time slots and a set of specified emotional states that may be expected from an audience at the set of time slots at playback of the media item. The calibration system may further include a media device configured to execute the playback of the media item to the audience and a plurality of different types of sensors configured to capture emotional response data from the audience at the playback of the media item. Further, the calibration system may include a control circuitry that may be configured to embed a first marker in the media item played by the media device. The first marker may be embedded in the media item based on the expected-emotions-tagging metadata. The control circuitry of the calibration system may be further configured to compute a reaction delay for a first emotional response of the audience captured by the plurality of different types of sensors. Such reaction delay may be computed for a first scene of the media item with respect to a position of the first marker that may span a first time slot. Such first time slot may correspond to the first scene in the media item. The control circuitry may be further configured to calibrate the position of the first marker to associate a first set of frames of the first scene with the first emotional response. The association of the first set of frames with the first scene may be done based on at least the computed reaction delay.

In accordance with an embodiment, the plurality of different types of sensors may include a set of audio sensors, a set of image sensors, and a set of biometric sensors. The control circuitry may be configured to assign a weight to each sensor of the plurality of different types of sensors prior to the playback of the media item by the media device. Thereafter, the control circuitry may be further configured to pre-calibrate the plurality of different types of sensors before the playback of the media item by the media device. The pre-calibration may be done to capture the emotional response data from the audience at the playback of the media item.

In accordance with an embodiment, the control circuitry may be further configured to pre-calibrate the set of audio sensors before the playback of the media item by the media device. Such pre-calibration may be done based on a playback of a test media item by the media device in a test environment. The playback of the test media item may be done in the presence of a test audience and an absence of the test audience.

In accordance with an embodiment, the control circuitry may be further configured to generate a noise signal based on at least a difference between a first audio signal and a second audio signal. The first audio signals may be captured by the set of audio sensors in the test environment in the presence of the test audience and the second audio signal may be captured by the set of audio sensors in the test environment in the absence of the test audience. Thereafter, the control circuitry may be further configured to assign a weight to each of the set of audio sensors for the pre-calibration of the set of audio sensors, based on the generated noise signal.

In accordance with an embodiment, the control circuitry may be further configured to pre-calibrate the set of image sensors of the plurality of different types of sensors before the playback of the media item by the media device. Such calibration may be done based on a playback of a test media item by the media device in a test environment in presence of a test audience. The control circuitry may be further configured to compute a number of faces that may be missed at a detection of number of faces between at least two image frames at playback of the test media item. An error rate may be further estimated for each image sensor of the set of image sensors, based on a change in the number of faces detected for the at least two image frames of the test media item. The control circuitry may assign a weight to each of the set of image sensors for the pre-calibration of the set of image sensors, based on the generated error rate.

In accordance with an embodiment, the control circuitry may be further configured to pre-calibrate the set of biometric sensors of the plurality of different types of sensors before the playback of the media item by the media device. Such pre-calibration of the set of biometric sensors may be done based on a measurement of biometric data in a test environment in presence of a test audience at playback of a test media. The control circuitry may further determine a standard deviation in the measured biometric data of the test audience at the playback of the test media. A weight may be further assigned by the control circuitry to each biometric sensor of the set of biometric sensors for the pre-calibration of the set of biometric sensors. Such weight may be assigned to each biometric sensor of the set of biometric sensors based on a difference in the measured biometric data of each user of the test audience with respect to the determined standard deviation.

In accordance with an embodiment, the control circuitry may be further configured to receive a plurality of different types of input signals from the plurality of different types of sensors. Such plurality of different types of input signals may be received for the audience at the playback of the media item. The plurality of different types of input signals may correspond to the emotional response data of the audience. The control circuitry may be further configured to determine a peak emotional response level for each emotional response for each user of the audience based on the received plurality of different types of input signals.

In accordance with an embodiment, the control circuitry may be further configured to normalize the received plurality of different types of input signals. Such normalization may be done based on the determined peak emotional response level for each emotional response by each user at the playback of the media item. The received plurality of different types of input signals may be normalized further based on a geographical region of the audience. The control circuitry may further synchronize and overlay the normalized plurality of different input signals in a timeline, which may be same as a playback timeline of the media item.

In accordance with an embodiment, the control circuitry may be further configured to generate an amalgamated audience response signal for the media item. Such amalgamated audience response signals may be generated based on the synchronized plurality of different input signals and a plurality of weights assigned to the plurality of different types of sensors. The control circuitry may further identify a set of common positive peaks and a set of common negative peaks in each of the plurality of different types of input signals based on the overlay of the plurality of different types of input signals. A plurality of highlight points and a plurality of lowlight points may be further calculated by the control circuitry for a plurality of scenes of the media item, based on the identified set of common positive peaks and the set of common negative peaks.

In accordance with an embodiment, the control circuitry may be further configured to compute a transmission delay for the first emotional response at the playback of the first scene of the media item. The transmission delay may be associated with the capture and a transmission of the emotional response data from the plurality of different types of sensors. The transmission delay may be computed with respect to the position of the first marker of a plurality of markers that may be embedded in the media item. The control circuitry may further calibrate the position of the first marker to associate the first set of frames of the first scene with the first emotional response, based on the computed transmission delay. The control circuitry may shift a first timestamp of a first lowlight point of the plurality of lowlight points to a second timestamp, based on the computed reaction delay and the transmission delay.

In accordance with an embodiment, the reaction delay for the first emotional response may be computed further based on a geographical region of the audience, a type of reaction, a type of scene, and a type of expected response from the audience. The control circuitry may further shift a first timestamp of a first highlight point of the plurality of highlight points to a second timestamp, based on the computed reaction delay and the transmission delay.

In accordance with an embodiment, the control circuitry may be further configured to predict a set of new highlight points and a set of new lowlight points in the media item. Such prediction may be done, based on a change in control parameters using a simulation engine. The control parameters may include a genre of the media item and a geographical region, a race, an age group, and a gender of the audience. The control circuitry may be further configured to compare a first media item with a second media item using the simulation engine, based on a video score, an audio score, and a distribution score. The video score, the audio score, and the distribution score may be generated using the simulation engine based on an accuracy of the capture of emotion response data.

FIG. 1 is a block diagram that illustrates an exemplary network environment for a calibration system for audience response capture and analysis of media content, in accordance with an embodiment of the disclosure. With reference to FIG. 1, there is shown a network environment 100 that includes a calibration system 102. The calibration system 102 may be configured to process a media item 104. The media item 104 may include a plurality of markers at a plurality of positions within the media item 104. For example, as shown, the media item 104 may include a first marker 106 that spans a first timeslot 106A to 106B and a second marker 108 that spans a second timeslot 108A to 108B. The network environment 100 may further include a media device 110. An audience 112 may engage with the media item 104 via the media device 110. The network environment 100 may further comprise a plurality of different types of sensors 114. The plurality of different types of sensors 114 may include a set of audio sensors 114A, a set of image sensors 114B, and a set of biometric sensors 114C. There is also shown a test audience 116.

In some embodiments, the media device 110, the audience 112, the plurality of different types of sensors 114, and the test audience 116 may be present in a closed media presentation environment (such as an auditorium 118, a movie theater, an indoor exhibition, and the like). The media device 110 may be a display screen suitably positioned to be viewed by the audience 112 in the auditorium 118. In some embodiments, the media device 110, the audience 112, the plurality of different types of sensors 114, and the test audience 116 may be present in an open media presentation environment (such as an outdoor concert area or an outdoor exhibition). The media device 110 and the plurality of different types of sensors 114 may be communicatively coupled to the calibration system 102, through a communication network 120. A set of media items, such as the media item 104 or a test media item, may be stored locally on at least one of the calibration system 102 or the media device 110.

The calibration system 102 may comprise suitable logic, circuitry, and interfaces that may be configured to capture an audience response at playback of the media item 104. The calibration system 102 may be further configured to analyze the audience response to calibrate the plurality of markers in the media item 104 of the set of media items. Alternatively stated, the calibration system 102 may embed one or more markers in the media item 104 and calibrate a position of the plurality of markers in the media item 104 based on an audience response at specific durations of playback of the media item 104. In some embodiments, the calibration system 102 may be implemented as an internet of things (IOT) enabled system that operates locally in the network environment 100 or remotely, through the communication network 120. In some embodiments, the calibration system 102 may be implemented as a standalone device that may be integrated within the media device 110. Examples of implementation of the calibration system 102 may include a projector, a smart television (TV), a personal computer, a special-purpose device, a media receiver, such as a set top box (STB), a digital media player, a micro-console, a game console, an (High Definition Multimedia Interface) HDMI compliant source device, a smartphone, a tablet computer, a personal computer, a laptop computer, a media processing system, or a calibration device.

The media device 110 may comprise suitable logic, circuitry, and interfaces that may be configured to execute playback of the set of media items, for example, the media item 104. The media device 110 may or may not include a display screen or a projection means, an audio device, and a set of input/output (I/O) devices. The media device 110 may be placed in a closed environment such that the playback of the set of media items through the media device 110 may lie in a field of audio-visual (FOA-V) reception of the audience 112. The media device 110 may comprise at least a first speaker to output an audio signal of the media item 104. Examples of the first speaker may include, but is not limited to, a wireless speaker or a wired speaker.

In some embodiments, the media device 110 may be implemented as a distributed set of audio devices, display screens, and media playback devices. For example, a media device in a multiscreen theater may have different display screens connected to different speakers placed at different selectively determined locations in the multiscreen theater for a surround sound effect, with different speakers and different screens connected to a single media player device. Examples of the media device 110 may include, but are not limited to, a liquid crystal display (LCD) television, a Light Emitting Diode (LED) television, and an LCD projector. Examples of the different audio devices may include, but are not limited to, a tweeter speaker, a subwoofer speaker, a woofer speaker, and a treble speaker. Examples of an I/O device may include, but are not limited to, a joystick, a mouse, a keyboard, and a motion sensor, a gesture sensor, a Kinect-based sensor.

The plurality of different types of sensors 114 may comprise suitable logic, circuitry, and interface that may be configured to capture a plurality of different types of input signals from an audience (e.g., the test audience 116 or the audience 112), at the playback of a media item (e.g., the media item 104). The captured plurality of different types of input signals may correspond to emotional response data associated with the audience 112 at the playback of the media item 104. The plurality of different types of sensors 114 may include the set of audio sensors 114A, the set of image sensors 114B, and the set of biometric sensors 114C.

The set of audio sensors 114A may be a set of microphones, which may positioned at two different locations within the closed environment, to capture audio signals from the speaker or the audience 112 at a pre-calibration stage and a calibration stage. The set of image sensors 114B may be a set of image capturing devices, such as a set of cameras. The set of image sensors 114B may be positioned at different locations in the closed or open media screening environment, such as the auditorium 118, to capture a number of faces from the audience 112 at the playback of the media item 104 by the media device 110.

The set of biometric sensors 114C may be a plurality of sensors that may be configured to capture biometric data of the audience 112 at the playback of the media item 104 of the set of media items. Examples of a biometric sensor may include but is not limited to, a pulse rate sensor, a breath rate sensor, a body temperature sensor, or a skin conductance sensor, or other specialized sensors to measure different emotions aroused in the audience 112 at the playback of the set of media items. In some embodiments, the set of biometric sensors 114C may be non-invasively attached to the body of each member of the audience 112. In other embodiments, the set of biometric sensors 114C may be invasively implanted in the body of each member of the audience 112, for example, an ingestible capsule with nano-biometric sensors. In some implementations, instead of a set of biosensors, a single standalone sensor device may be installed in the closed environment, to collectively detect a heart signature and further monitor the biometric data of all the members of the audience 112.

The communication network 120 may include one or more mediums through which the calibration system 102 may communicate with the media device 110 and the plurality of different types of sensors 114. Examples of the communication network 120 may include, but are not limited to the Internet, a public switched telephone network (PSTN), a third generation (3G), 4G, or 5G mobile network, a radio communication network, a cloud network, or a Wireless Fidelity (Wi-Fi) network and/or a Bluetooth wireless network In operation, a control signal may be received by the calibration system 102 from a user or a server. The control signal may utilized to initialize a multistage operation to pre-calibrate the plurality of different types of sensors 114 in the auditorium 118 and calibrate a position of the plurality of markers in a set of media items (for example, the media item 104) based on analysis of an audience response. The multistage operation may include a pre-calibration stage, a calibration stage, and a post-calibration stage.

In the pre-calibration stage, the calibration system 102 may pre-calibrate the plurality of different types of sensors 114 in the closed environment for the playback of the set of media items. The pre-calibration stage may further include an identification of noise components in the closed environment, a cancellation of the identified noise components, and an estimation of weight for different sensors of the plurality of different types of sensors 114 prior to a playback of the set of media items. The pre-calibration may be done to precisely capture emotional response data from the audience 112 at the playback of the media item 104, with a minimal effect of noise signals or measurement errors of different sensors on the captured emotional response data.

The calibration system 102 may pre-calibrate the set of audio sensors 114A. Such pre-calibration of the set of audio sensors 114A may be done based on a playback of a test media item by the media device 110 (i.e., before the playback of the media item 104 before an actual audience (such as the audience 112) for capture of audience response data). The test media item may be first played in a test environment in a presence of the test audience 116, and further in an absence of the test audience 116. Thereafter, the calibration system 102 may generate a noise signal based on analysis of the different audio signals captured by different audio sensors of the set of audio sensors 114A in the test environment. For example, a noise signal that may model a babble noise generated by different members of the audience 112 based on the analysis of different audio signals received from the set of audio sensors 114A placed in the closed environment. Thereafter, the calibration system 102 may be further configured to pre-calibrate the set of image sensors 114B of the plurality of different types of sensors 114. The set of image sensors 114B may be calibrated based on playback of the test media item by the media device 110 in the test environment in presence of the test audience 116. An error rate may be determined for each image sensor of the set of image sensors 114B. Such error rate may be determined based on a change in a number of faces detected for the at least two image frames of the test media item.

The calibration system 102 may be further configured to pre-calibrate the set of biometric sensors 114C of the plurality of different types of sensors 114 before the playback of the media item 104 by the media device 110. Such pre-calibration of the set of biometric sensors 114C may be done based on a measurement of biometric data in the test environment in presence of the test audience 116 at the playback of the test media. A standard deviation in the measured biometric data of the test audience 116 may be determined at the playback of the test media. The calibration system 102 may be further configured to assign a weight to each sensor of the plurality of different types of sensors 114 based on different estimations done for different types of sensors. For example, the set of audio sensors 114A may be weighted based on different levels of the captured noise components. The set of image sensors 114B may be weighted based on error rate in detection of number of faces. The set of biometric sensors 114C may be weighted based on deviations in the measured biometric data of the test audience 116. The detailed operation of pre-calibration has been discussed in detail in FIG. 2. The pre-calibration of the plurality of different types of sensors 114 enables obtaining of credible data from the plurality of different types of sensors 114.

In accordance with an embodiment, the calibration system 102 may be configured to recognize a new sensor and dynamically add the recognized sensor in a network of sensors, such as the plurality of different types of sensors 114, during the pre-calibration stage. Based on the recognition, the new sensor may be automatically categorized as a specific new type of sensor or one of the plurality of different types of sensors 114 without prior knowledge about the new sensor or the new type of sensor. The calibration system 102 may be configured to recognize input signals captured by the new sensor from the audience 112 or the test audience 116. The calibration system 102 may be further configured to correlate various values of the input signals to various emotional response from the audience 112 or the test audience 116. The calibration system 102 may be further configured to identify a noise signal in the various input signals captured by the newly added sensor. The newly added sensor may be further weighted based on the identified noise signal in the various input signals.

After the pre-calibration stage, the calibration system 102 may be configured to embed a set of markers in the media item 104 which may be played by the media device 110. The set of markers may be embedded based on the expected-emotions-tagging metadata stored for the media item 104 in a memory of the calibration system 102. The set of markers may be at least one of audio markers, video markers, or frame markers. As an example, an audio marker may be a high frequency human inaudible beacon or an ultrasonic beacon. The expected-emotions-tagging metadata may include an associative relationship between a set of time slots (or a set of scenes) and a set of specified emotional states that may be expected from the audience 112 at playback of the media item 104. The first marker 106 may be embedded at a first timestamp (or at the first timeslot 106A to 106B) at a first scene marked within the media item 104. The first timestamp (or time) may be mapped with a first emotional state, such as a happy state, a sad state, an angry state, and a neutral state, of a set of defined emotional states.

The calibration system 102 may store the expected-emotions-tagging metadata as a pre-stored data in a database managed by the calibration system 102. In some embodiments, the calibration system 102 may fetch the expected-emotions-tagging metadata from a production media server (or dedicated content delivery networks) and store the expected-emotions-tagging metadata in the memory of the calibration system 102. In certain scenarios, the calibration system 102 may be configured to store the expected-emotions-tagging metadata in the media item 104. The expected-emotions-tagging metadata may be a data structure with a defined schema, such as a scene index number (I), a start timestamp ($T_0$), an end timestamp (T1), and an expected emotion (EM). In certain scenarios, the expected-emotions-tagging metadata may comprise an expected emotion type and an expected sub-emotion type. An example of the stored expected-emotions-tagging metadata associated with the media item 104 (for example, a movie with a set of scenes), is (liven below, for example, in Table 1.

TABLE 1

A portion of expected-emotions-tagging metadata for the media item 104.

| Scene Number (I) | Start Timestamp ($T_0$) | End Timestamp (T1) | Expected Emotion | Expected Sub-Emotion |
|---|---|---|---|---|
| 1 | 0.59 min | 1.35 min | Surprise | Pleasant |
| 2 | 2.3 min | 2.59 min | Contempt | Extreme |
| 3 | 4.19 min | 7.25 min | Neutral | Neutral |
| 4 | 9.45 min | 15.64 min | Sad | Despair |
| 5 | 11.25 min | 18.59 min | Angry | Shock |
| 6 | 19.07 min | 23.34 min | Disgust | Mild |
| 7 | 32.44 min | 38.06 min | Happy | Surprise |
| 8 | 41.54 min | 52.49 min | Sad | Angry |
| ... | ... | ... | ... | ... |

The playback of a media item, such as the media item 104, of the set of media items may be initialized at the media device 110. The media device 110 may be configured to play the media item 104 in the field of audio visual reception (FOAV) of the audience 112. With the initialization of the playback of the media item 104 at the media device 110, the plurality of different types of sensors 114 may be activated to capture a set of emotional responses continuously at a playback duration of the media item 104.

The calibration system 102 may be configured to receive the plurality of different types of input signals from the plurality of different types of sensors 114. The plurality of different types of input signals may include audio signals from the set of audio sensors 114A, video signals that includes face data of the audience 112 from the set of image sensors 114B, and biometric signals from the set of biometric sensors 114C. Examples of audio signals may include, but are not limited to, audio data of claps, laughter, chatter, and whistles of the audience 112. Example of the face data may include but is not limited to a sequence of facial images (or a video feed) of the audience members. The sequence of facial images of the audience members may comprise specific expressions of the audience members. The face data may further comprise eye-tracking, motion-tracking, and gesture tracking information associated with the audience members. Examples of the biometric signals may include, but are not limited to, pulse rate data, heart rate data, body heat data, and body temperature data of each member of the audience 112. Such plurality of different types of input signals may correspond to a set of emotional responses of the audience 112 at the playback of the media item 104 at the media device 110. Thereafter, the calibration system 102 may be configured to generate an amalgamated audience response signal based on the synchronized plurality of different input signals and a plurality of weights assigned to the plurality of different types of sensors 114 that captures the plurality of different types of input signals.

Different members of the audience 112 may exhibit a different degree of expressive ability, which may be captured in the plurality of different types of input signals in real time or near-real time from the plurality of different types of sensors 114. For example, at a certain comic scene at the playback of the media item 104, different members of the audience 112 may exhibit different types of smiles or laughter. In order to robustly extract an aggregate emotional response for the comic scene, a normalization of the plurality of different types of input signals may be done. Therefore, the calibration system 102 may be configured to normalize the plurality of different types of input signals for each scene of the media item 104 based on different parameters of the audience 112.

In certain embodiments, the plurality of different types of input signals for different audiences from different geographical locations, for example, India, US, China, Germany, and Japan, may be analyzed. Users from different geographical locations may express emotions at different scale and such behavior may be captured in the plurality of different type of input signals. For example, an American audience may be more expressive as compared to an Asian audience. A different normalization for the plurality of different types of input signals may be applied for different geographical locations to facilitate analysis of the emotional response data from different geographical locations at the same scale.

In accordance with an embodiment, the calibration system 102 may be configured to compute a set of root mean square (RMS) values for the plurality of different types of input signals. The set of RMS values may be computed based on a geographical region of the audience 112, a type of reaction, a type of scene, and a type of expected response from the audience 112. For example, magnitude of the set of RMS values associated with the audience 112 may be greater or lesser based on a geographical location of the audience 112. The calibration system 102 may be configured to normalize the plurality of different types of input signals based on the geographical region of the audience 112. Alternatively stated, the calibration system 102 may be configured to shift the computed set of RMS values of the plurality of different types of input signals based on the geographical region of the audience 112.

In accordance with an embodiment, the calibration system 102 may be configured to compute a reaction delay for a first emotional response of the audience 112 captured by the plurality of different types of sensors 114 for a first scene of the media item 104 with respect to a position of the first marker 106. The first marker 106 may span a first time slot of the set of time slots in the media item 104. The first time slot may correspond to the first scene in the media item 104. Similar to computation of the reaction delay for the first scene, the calibration system 102 may be configured to compute a set of reaction delays for a set of emotional responses of the audience 112. Such set of reaction delays may be captured by the plurality of different types of sensors 114 for a set of scenes in the media item 104 with respect to a position of the set of markers. Each marker of the set of markers may span one time slot of the set of time slots in the media item 104.

The set of reaction delays may be computed further based on a geographical region of the audience 112, a type of reaction, a type of scene, and a type of expected response from the audience 112. For example, the audience 112 may continue generating the emotional response for the first scene even after playback of the first scene elapses and playback of a new scene begins. In such scenarios, the calibration system 102 may be configured to compute reaction delay and compare the computed reaction delay of the audience 112 with a numerical threshold. For example, the numerical threshold may be a time interval between "1" second and "10" seconds. The numerical threshold may be set in the calibration system 102 based on a set of parameters, such as the geographical location of the audience 112, a type of media item, the reaction type, and the expected-emotion-tagging metadata associated with the media item 104. In cases where the first scene is associated with sadness, then the first scene may elicit a prolonged emotion response from the audience 112 in comparison with a second scene which may be associated with a joke. The computed reaction delay is advantageous for calibration as it ensures that only the frames in the first scene that are responsible to elicit the sadness response are associated with the emotional state of sadness. Other frames in the first scene (i.e., a certain segment of the media item 104) that were initially associated with sadness or other expected emotional responses are disassociated with the sadness emotion.

The calibration system 102 may be further configured to compute a transmission delay for the set of emotional responses at the playback of the set of scenes of the media item 104. Such transmission delay may be associated with the capture and transmission of the emotional response data from the plurality of different types of sensors 114. The transmission delay may be computed with respect to the position of the plurality of markers that may be embedded in the media item 104. For example, for a sad scene in a movie, a reaction delay of "1.56 seconds" may be computed with a transmission delay of "0.5 seconds". Thus, an overall delay offset of "1.56+0.5 seconds", i.e. "2.06 seconds" may be computed for the given sad scene. Thereafter, the calibration system 102 may be configured to calibrate the position of the each marker of the plurality of markers to associate a set of frames of each scene with an emotional response. Such calibration of the position of each of the set of markers may be done based on at least the computed reaction delay and the computed transmission delay for a corresponding scene of the media item 104.

Figure 11:
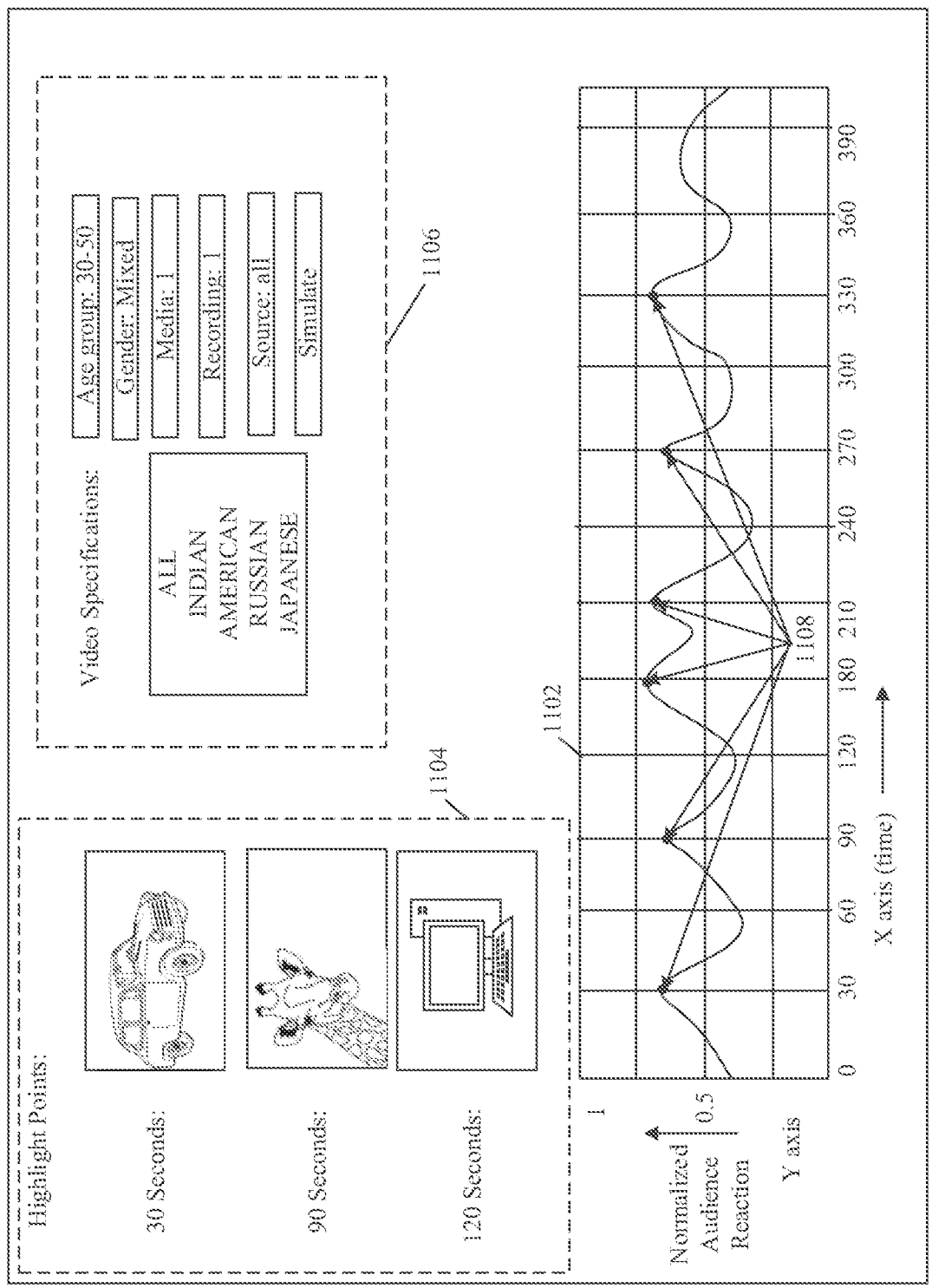
FIG. 11 illustrates an exemplary fifth user interface, which illustrates a plurality of highlight points of a media item, in accordance with an embodiment of the disclosure.
Figure 12A:
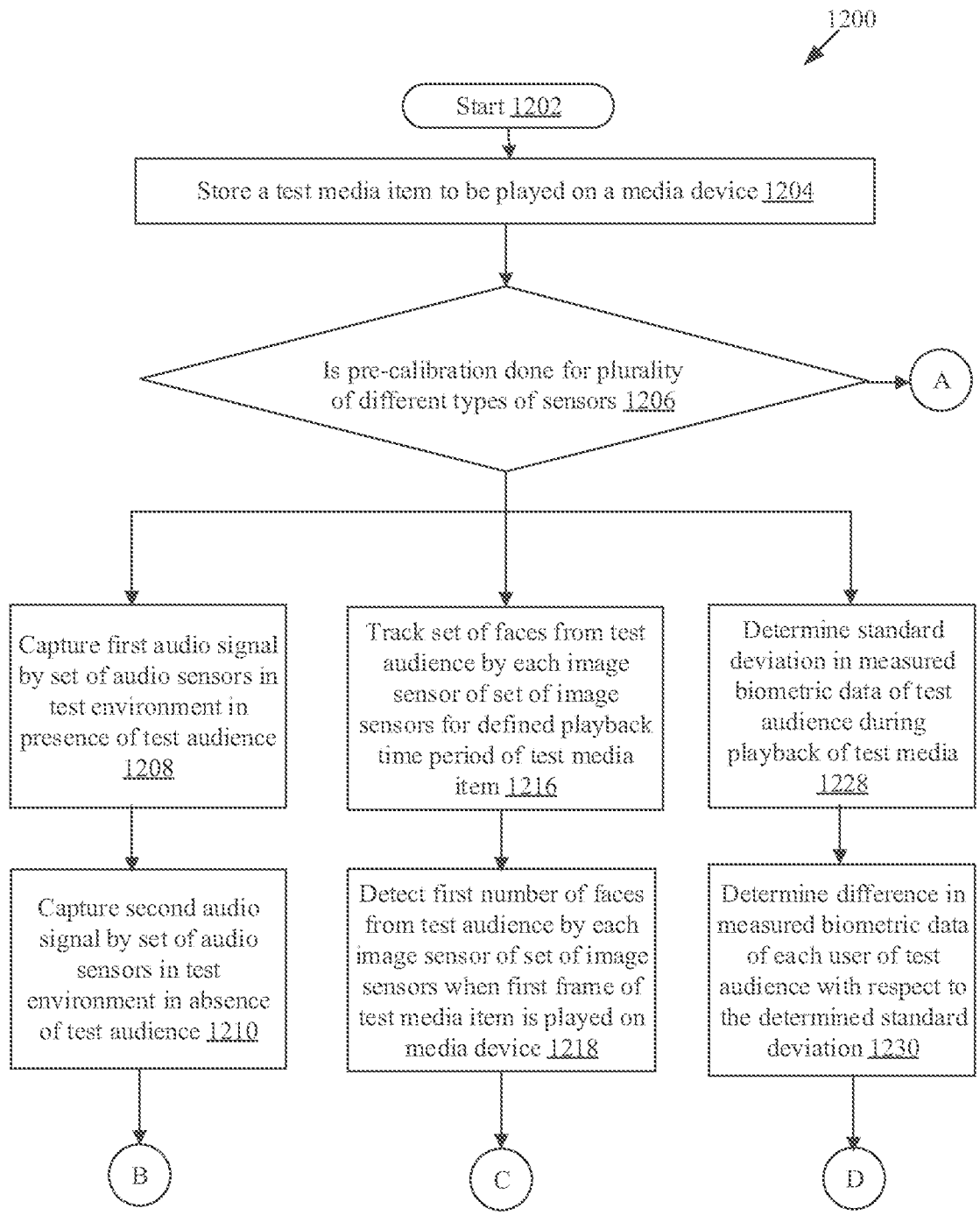
FIGS. 12A, 12B, 12C, 12D, and 12E collectively depict a flow chart that illustrates an exemplary method for calibration for audience response capture and analysis of media content, in accordance with an embodiment of the disclosure.
Figure 12B:
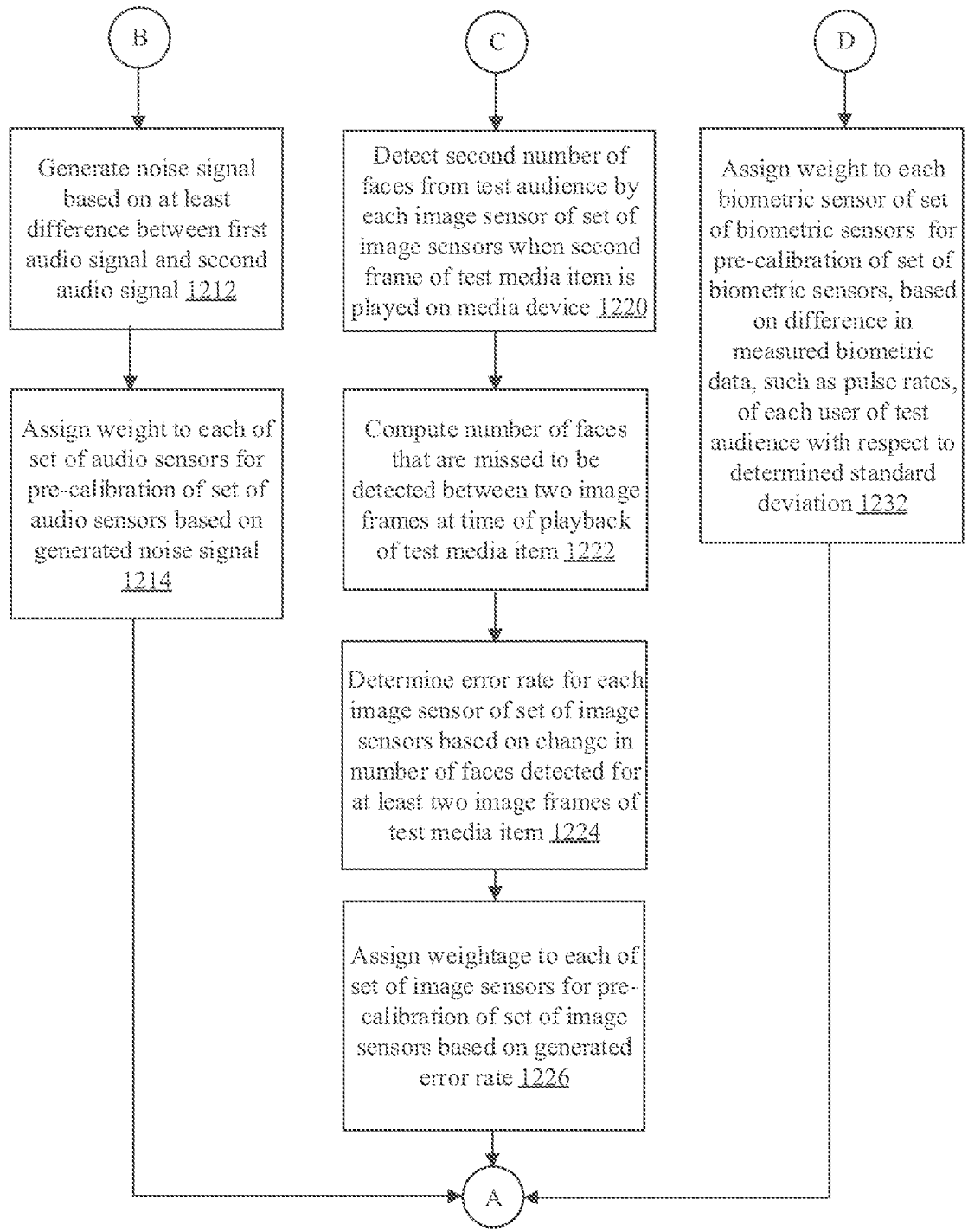
Figure 12C:
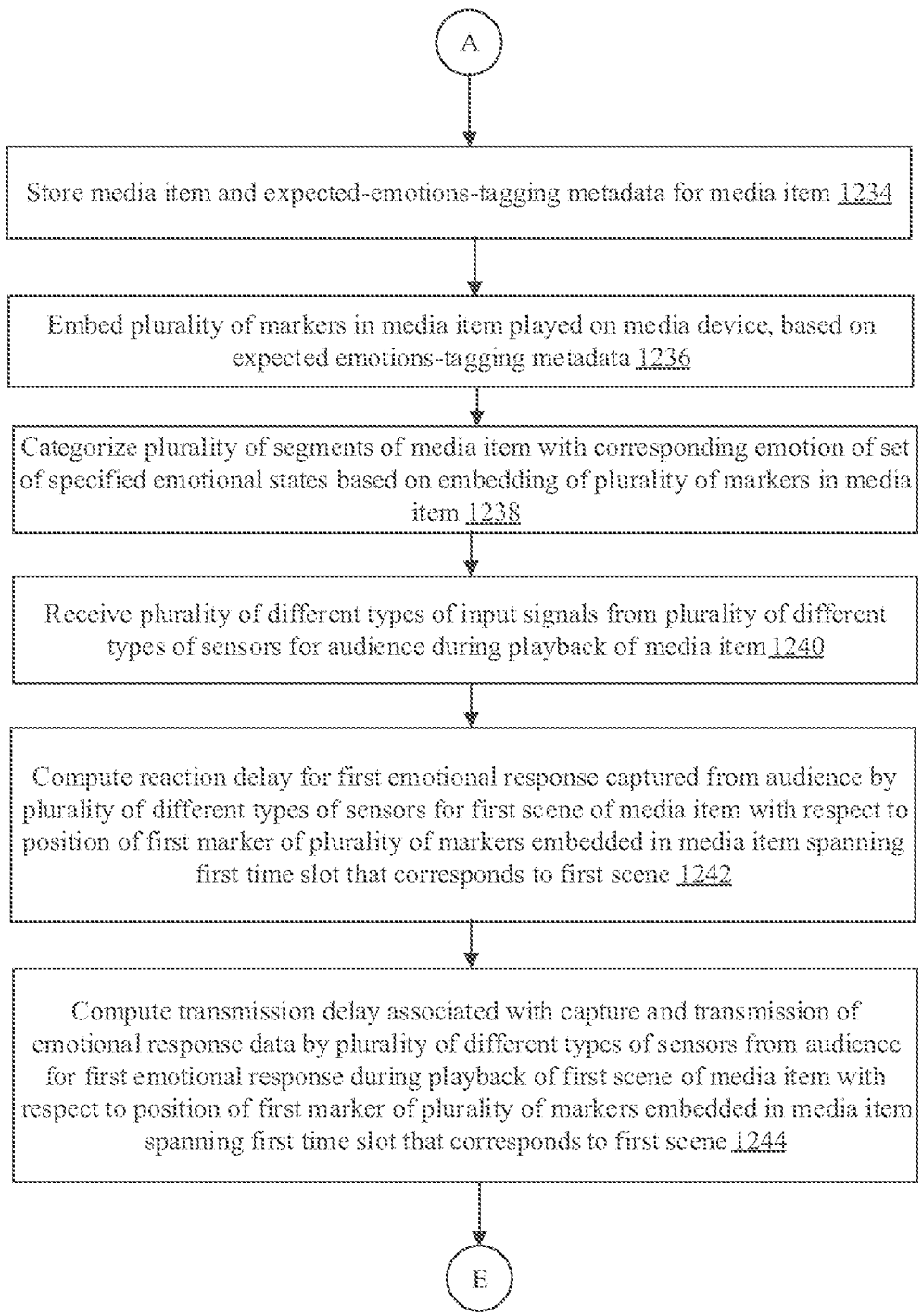
Figure 12D:
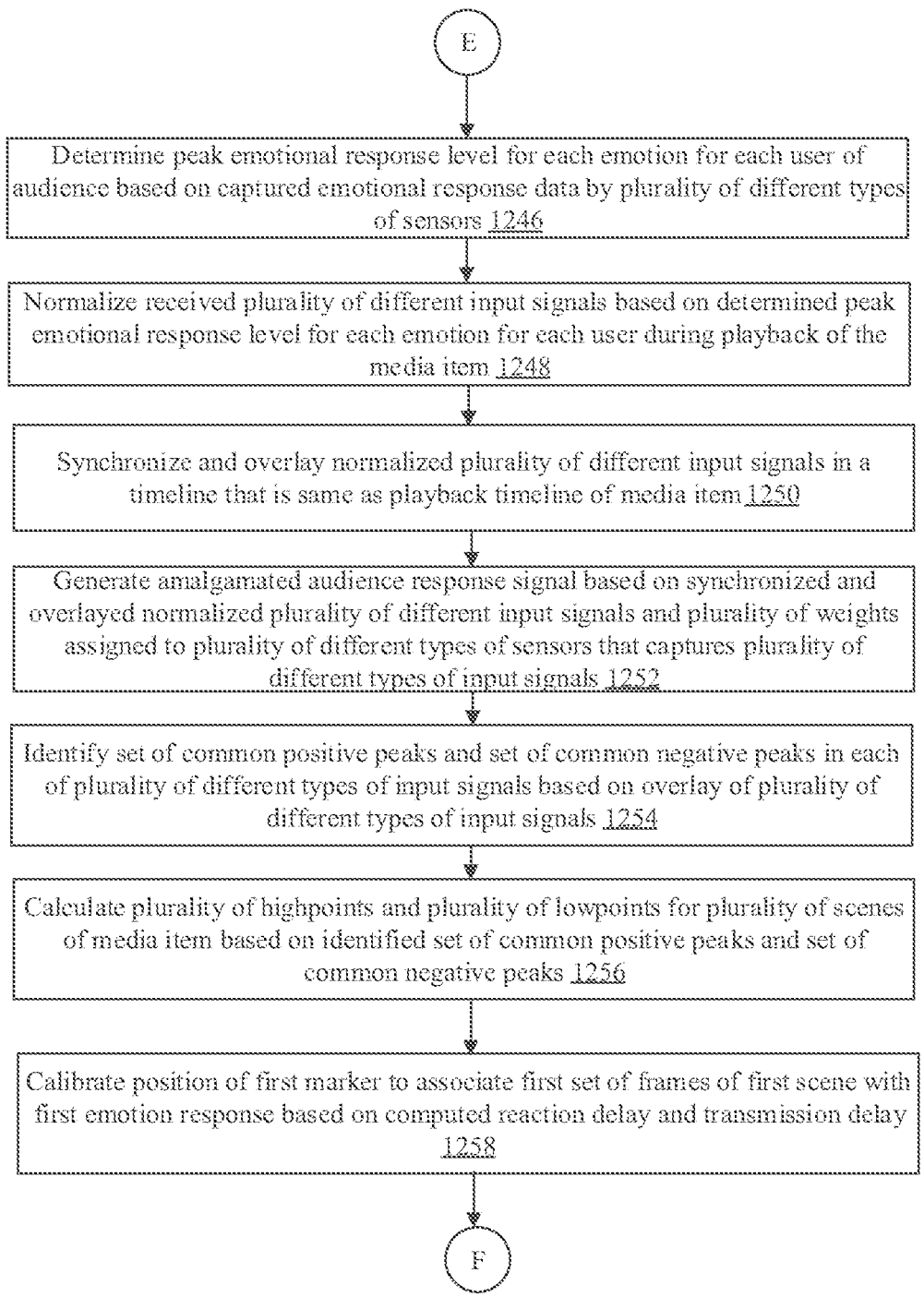
Figure 12E:
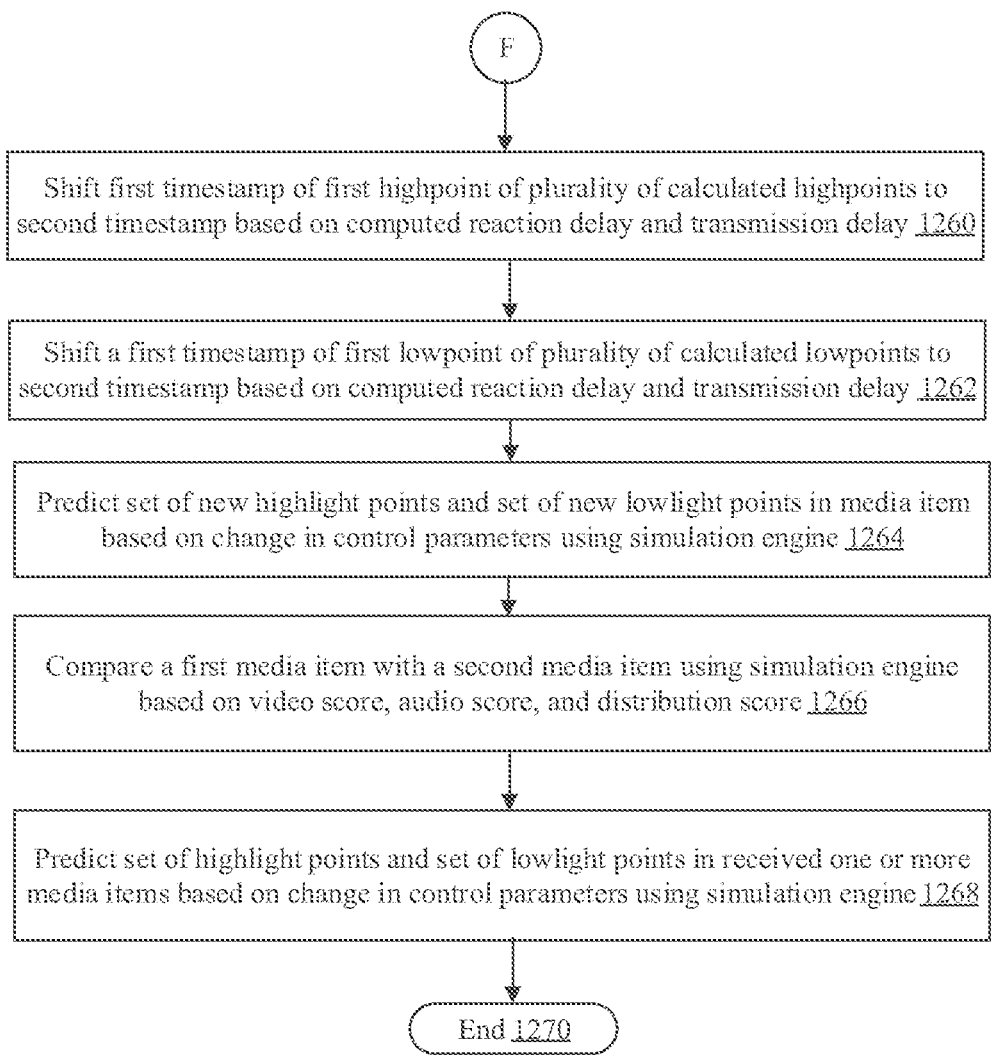

In accordance with an embodiment, the normalized plurality of different type of input signals may be utilized to determine a peak emotional response level for each emotional response from each user of the audience 112. Thereafter, the normalized plurality of different types of input signals may be synchronized and overlaid in a timeline that may be same as a playback timeline of the media item 104. A set of common positive peaks and a set of common negative peaks in each of the plurality of different types of input signals may be further identified based on the overlay of the plurality of different types of input signals. An example of the set of common positive peaks and the set of common negative peaks is shown in FIG. 6B and FIG. 11. The calibration system 102 may be configured to calculate a plurality of highlight points and a plurality of lowlight points for a plurality of scenes of the media item 104. Such plurality of highlight points or the plurality of lowlight points may be calculated based on the identified set of common positive peaks and the set of common negative peaks. In certain scenarios, the calibration system 102 may be configured to identify the set of common positive points and the set of common negative points without using the expected-emotion-tagging metadata associated with the media item 104. The set of common positive points and the set of common negative points may be identified based on the set of emotional responses of the audience 112 at the playback of the set of scenes of the media item 104.

For example, for a "1.5 hour long movie", the normalized biometric data, the normalized audio signal, and the normalized expression data is overlaid in a timeline. A set of "6 common positive peaks" and a set of "4 common negative peaks" are further identified in the normalized biometric data, the normalized audio signal, and the normalized expression data. The "6 common positive peaks" may correspond to a comic emotion, a sad emotion, and a contempt emotion of the audience 112. Similarly, the set of "4 common negative peaks" may correspond to a neutral expression of the audience 112. The set of "4 negative peaks" may be mapped with a marker for a specific expected emotions data. A neutral emotion with respect to a specific expected emotion may be identified as a lowlight point.

In accordance with an embodiment, the calibration system 102 may be configured to predict a set of new highlight points and a set of new lowlight points in the media item 104. Such prediction of the set of new highlight points and the set of new lowlight points may be done using a simulation engine based on application of different techniques and a change in control parameters. Examples of the control parameters may include, but is not limited to a genre of the media item 104, a geographical region, a race, an age group, and a gender of an audience.

In the post calibration stage, the calibrated set of markers may be utilized to precisely map the emotions expressed by the audience 112 in real time or near-real time. A measure of an impact of different marked scenes may be analyzed based on the set of common peaks in the plurality of different types of input signals. Such impact measure may be utilized to derive a rating for each marked scene of the media item 104 and a cumulative rating for the entire media item. Further, calibration system 102 may be configured to generate, using the simulation engine, a video score, an audio score, and a distribution score for the media item 104 based on an accuracy of the capture of emotion response data from the audience 112. Such scores (such as the video score, the audio score, and the distribution score) may be utilized to compare a first media item (e.g., a first movie), with a second media item (e.g. a second movie) of the set of media items. A final rating or impact of different media items may be identified based on the comparison of scores of different media items with each other.

Figure 2:
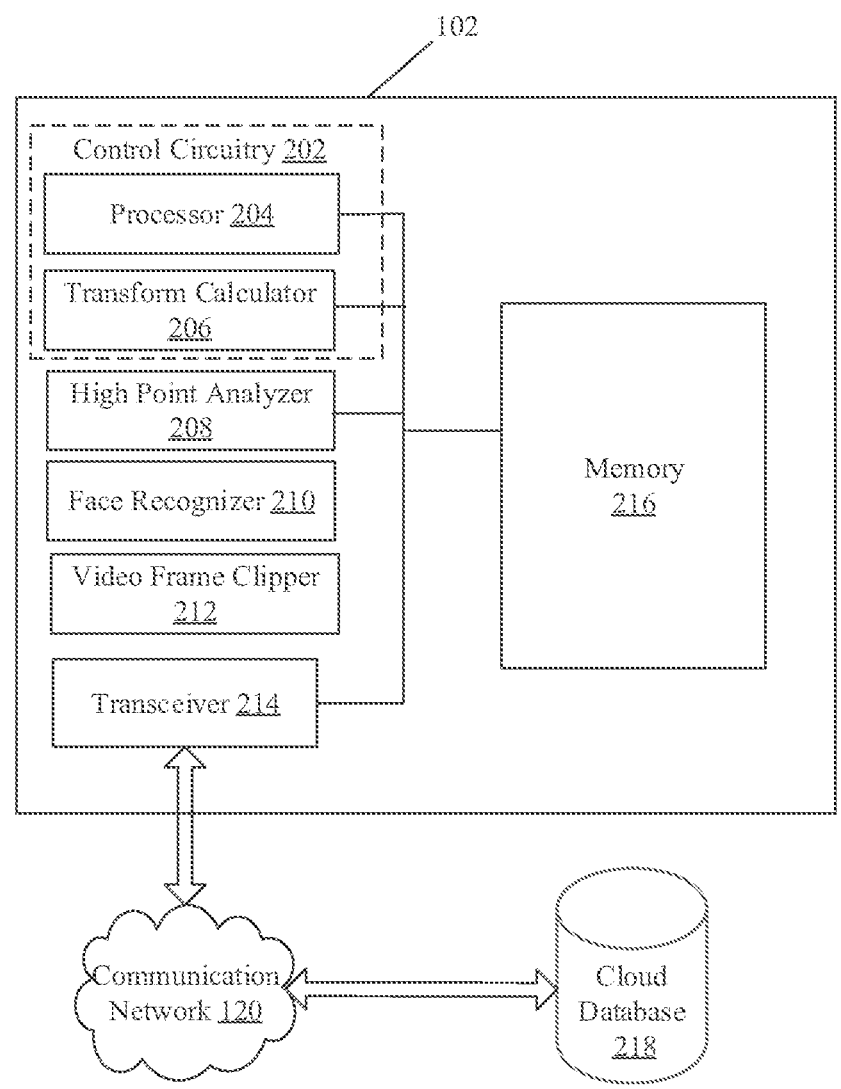
FIG. 2 is a block diagram that illustrates a calibration system for media content, in accordance with an embodiment of the disclosure.

FIG. 2 is a block diagram that illustrates a calibration system for audience response capture and analysis of media content, in accordance with an embodiment of the disclosure. FIG. 2 is explained in conjunction with elements from FIG. 1. With reference to FIG. 2, there is shown the calibration system 102. The calibration system 102 may include a control circuitry 202. The control circuitry 202 may include a processor 204, a transform calculator 206, a high point analyzer 208, a face recognizer 210, and a video frame clipper 212. The calibration system 102 may further comprise a transceiver 214 and a memory 216. The memory 216 may comprise a local database. In accordance with an embodiment, the calibration system 102 may communicate with via the communication network 120, to a cloud database 218, using the transceiver 214.

The processor 204 may comprise suitable logic, circuitry, and interfaces that may be configured to execute a set of instructions stored in the memory 216. The set of instruction may be associated with execution of different operations, such as high point analysis, transform estimation, data normalization, weight calculation, noise estimation, noise cancellation, and the like. Examples of the processor 204 may include, but are not limited to, an x86-based processor, an x64-based processor, a Reduced Instruction Set Computing (RISC) processor, an Application-Specific Integrated Circuit (ASIC) processor, and a Complex Instruction Set Computing (CISC) processor.

The transform calculator 206 may comprise suitable logic, circuitry, and interfaces that may be configured to execute a signal transformation of the plurality of different types of signals, to identify different noise components in the plurality of different types of input signals. For example, a babble noise created by the audience 112 or high frequency noise created by speakers in the closed environment may be identified. The transform calculator 206 may be implemented based on the processor, such as one of a programmable logic controller (PLC), a microcontroller, an X86-based processor, a Reduced Instruction Set Computing (RISC) processor, an Application-Specific Integrated Circuit (ASIC) processor, a Complex Instruction Set Computing (CISC) processor, and/or other hardware processors.

The high point analyzer 208 may comprise suitable logic, circuitry, and interfaces that may be configured to identify a set of highlight points and a set of lowlight points in a media item, such as the media item 104. The identification of the set of highlight points and the set of lowlight points may be continuously mapped at the playback duration of the media item 104. The high point analyzer 208 may be implemented as a software application or a hardware circuit, such as an Application-Specific Integrated Circuit (ASIC) processor.

The face recognizer 210 may comprise suitable logic, circuitry, and interfaces that may be configured to detect a change in facial expression of different users in the audience 112 by the set of image sensors 1148 of the plurality of different types of sensors 114. The face recognizer 210 may be further configured to detect static facial expressions of different users in the audience 112 by the set of image sensors 1148 of the plurality of different types of sensors 114. The face recognizer 210 may be implemented as a software application or a hardware circuit, such as an Application-Specific Integrated Circuit (ASIC) processor.

The video frame clipper 212 may comprise suitable logic, circuitry, and interfaces that may be configured to generate a plurality of highpoint media segments based on the identified set of highlight points and the set of lowlight points. The video frame clipper 212 may be implemented based on the processor 204, such as one of a programmable logic controller (PLC), a microcontroller, an X86-based processor, a Reduced Instruction Set Computing (RISC) processor, an Application-Specific Integrated Circuit (ASIC) processor, a Complex Instruction Set Computing (CISC) processor, and/or other hardware processors.

The transceiver 214 may comprise suitable logic, circuitry, and interfaces that may be configured to communicate with other electronic devices, via the communication network 120. The transceiver 214 may implement known technologies to support wireless communication. The transceiver 214 may include, but are not limited to an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer circuitry. The transceiver 214 may communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

The memory 216 may comprise suitable logic, circuitry, and interfaces that may be configured to store a set of instructions executable by the processor 204, the transform calculator 206, the high point analyzer 208, the face recognizer 210, and the video frame clipper 212. The memory 216 may be configured to further store the set of media items, such as the media item 104 and associated expected-emotions-tagging metadata. Examples of implementation of the memory 216 may include, but are not limited to, Random Access Memory (RAM), Read Only Memory (ROM), Hard Disk Drive (HDD), and/or a flash drive.

The cloud database 218 may comprise suitable logic, circuitry, and/or interfaces that may be configured to store expected-emotions-tagging metadata that may include an associative relationship between a set of time slots and a set of specified emotional states that are expected from the audience 112 in the set of time slots during playback of a media item, for example, the media item 104. The cloud database 218 may be configured to manage a curated repository of a set of media items, which may be retrieved for playback at the media device 110.

In operation, control signals may be received at the calibration system 102 to initialize acquisition of emotional response data based on different sensor-based data and audience 112-based data. Such emotional response data may be utilized to precisely update durations of different high points/low points in a media item (for example, the media item 104), which may be scheduled for selected/scheduled for playback at the media device 110. Such control signals may be routed to a processor 204, such as the processor 204 of the calibration system 102. Thereafter, the processor 204 may be configured to initially pre-calibrate the plurality of different types of sensors 114 prior to the playback of the media item (such as the media item 104), for which emotional response data is to be captured from the audience 112 The pre-calibration of the set of audio sensors 114A, the set of image sensors 114B and the set of biometric sensors 114C of the plurality of different types of sensors 114 may ensure that credible data from the plurality of different types of sensors 114 is captured at next processing stage.

Audio Sensor Pre-Calibration:

In accordance with an embodiment, the set of audio sensors 114A may include two audio sensors, such as a first audio sensor and a second audio sensor. The first audio sensor may be placed near the audio output source (such as the first speaker) of the media device 110. The first audio sensor may capture a plurality of audio signals when placed near the audio output source. The plurality of audio signals may comprise an audio signal of the media item 104. In addition to the audio signal of the media item 104, the plurality of audio signals may further comprise other noise signals in the background, for example, environmental noises, such as waves, traffic noise, alarms, babble, bio acoustic noise from animals, birds, and insects, and mechanical noise from devices, such as air conditioners, refrigerators, power supplies, electric motors, and the like. A second audio sensor may be further placed at a position such that a maximum of audio response can be captured from either of the test audience 116 or the actual audience (e.g., at a location where the test audience 116 is supposed to be seated). The second audio sensor may also capture noise signals in the background for example, environmental noises, such as waves, traffic noise, alarms, babble, bio acoustic noise from animals, birds, and insects, and mechanical noise from devices, such as air conditioners, refrigerators, power supplies, electric motors, and the like.

First, a test media item may be recorded in a test environment in absence of the test audience 116, such as an empty auditorium. Such recorded test media item may be a first audio signal. Thereafter, the processor 204 may be configured to play the test media item in the test environment in presence of the test audience 116. The set of audio sensors 114A may be configured to capture a second audio signal from the test environment at playback of the test media item. The second audio signal may comprise sounds, such as claps, whistles, laughs, chatter, and the like, from the test audience 116, and also sound of the audio output related to the test media item. The sounds, such as claps, whistles, laughs, chatter, and the like, from the test audience 116 may be the emotional response data of the test audience 116, which is of interest. The sound of the audio output related to the test media item may be considered a noise signal, which is removed using the first audio signal recorded in the absence of the test audience 116, such as an empty auditorium, for reference. The transform calculator 206 may be configured to determine a difference between the second audio signal and the first audio signal.

In accordance with an embodiment, the transform calculator 206 may be configured to determine the difference based on one of an accord audio framework method, a fast Fourier transformation method, and an independent component analysis method. The transform calculator 206 may be configured to generate an audience noise signal based on the difference between the first audio signal and the second audio signal, which may be estimated based on transform methods, such as Short Time Fourier Transform (STFT). The audience noise signal may include audience noise without any original sound of the audio output related to the test media item. The transform calculator 206 may be further configured to subtract the second audio signal with the audience noise signal to re-generate a final audio signal that may resemble the first audio signal captured in the empty auditorium. Thereafter, the final audio signal and the first audio signal may be compared to estimate a root mean square error (RMS) using known mathematical techniques. The processor 204 may be configured to determine an error rate of each of the set of audio sensors 114A based on the comparison.

In accordance with an embodiment, the processor 204 may be further configured to generate a specific weight for each of the set of audio sensors 114A based on the determined error rate associated with the respective audio sensor of the set of audio sensors 114A. The processor 204 may be configured to assign a plurality of weights to the set of audio sensors 114A. The processor 204 may be configured to play the test media item in the test environment, and execute multiple iterations of noise cancellation to calibrate the set of audio sensors 114A based on the assigned weights (or coefficients).

Image Sensor Pre-Calibration:

In accordance with an embodiment, the processor 204 may be configured to play the media item 104 in the test environment (such as the auditorium 118) using the media device 110. The test environment may comprise the test audience 116. In some embodiments, the processor 204 may be configured to detect a first set of faces from the test audience 116 by each image sensor when a first image frame of the test media item is played by the media device 110. The set of image sensors 114B may be further configured detect a second set of faces by each image sensor from the test audience 116 when a second image frame of the test media item is played by the media device 110. Alternatively stated, the processor 204 may be further configured to detect and track a set of faces from the test audience 116 by each image sensor of the set of image sensors 114B, for a defined playback time period of the test media item. Each face may be assigned a unique identifier (or a UID). Such UIDs may be utilized to identify new faces or find faces missed to be detected in subsequent image frames by a single image sensor. In some embodiments, the set of faces in successive frames may be detected at a cloud server, via an application programming interface (API) for face detection.

The processor 204 may be configured to determine an error rate for each image sensor of the set of image sensors 114B based on a difference in number of faces in the first set of faces and the second set of faces. The processor 204 may be configured to assign a specific weight for each of the set of image sensors 114B based on the determined error rate for the respective image sensor for the pre-calibration of the set of image sensors 114B.

For example, for a set of "5 frames" captured a first image sensor of the set of image sensors 114B may be stored in an array, as given below, for example, in Table 2.

TABLE 2

| Frame 1 ($F_1$) | Frame 2 ($F_2$) | Frame 3 ($F_3$) | Frame 4 ($F_4$) | Frame 5 ($F_5$) | . . . |
|---|---|---|---|---|---|
| 4 Faces | 5 Faces | 4 Faces | 6 Faces | 5 Faces | . . . |

A deviation in a detected number of faces may be computed between every adjacent pair of array element, such as a deviation in the detected number of faces between "Frame 1" and "Frame 2". A rate of change of detected number of faces may be further computed, as given below, for example, in Table 3.

TABLE 3

| $F_{2-1}$ | $F_{3-2}$ | $F_{4-3}$ | $F_{5-4}$ | . . . |
|---|---|---|---|---|
| 1 Face | 1 Face | 2 Faces | 1 Face | . . . |

The processor 204 may calculate an error rate (or error percentage) for the first image sensor based on addition of computed rate of change of the detected number of faces. If the standard error for the first image sensor is "3 faces" and the computed error is "1+1+2+1 faces", i.e. "5 faces", then the error rate for the first image sensor may be "5-3/5", i.e. "0.4" (or "40%"). The weight value for the first image sensor may be computed as "1-0.4", i.e. "0.6".

Biometric Sensor Pre-Calibration:

In accordance with an embodiment, the processor 204 may be further configured to play the test media item in the test environment (such as the auditorium 118) using the media device 110. The test environment may include a test audience (such as the test audience 116). In certain scenarios, the set of biometric sensors 114C may be configured to capture a plurality of pulse rates from the test audience 116. For example, each of the set of biometric sensors 114C may be configured to capture a pulse rate of a different user of the test audience 116. The processor 204 may be configured to determine a standard deviation of the captured plurality of pulse rates of the test audience 116. The processor 204 may be configured to determine a difference of a pulse rate captured by each biometric sensor of the set of biometric sensors 114C with respect to the determined standard deviation of the plurality of pulse rates captured by the set of biometric sensors 114C.

The processor 204 may be configured to determine an error rate of each biometric sensor of the set of biometric sensors 114C based on the determined difference of the pulse rate captured by the respective biometric sensor with respect to the determined standard deviation. The processor 204 may be configured to assign a specific weight for each of the set of biometric sensors 114C based on the determined error rate for the respective biometric sensor for the pre-calibration of the set of biometric sensors 114C. The processor 204 may be configured to execute the pre-calibration of the plurality of different types of sensors 114 to assign a plurality of weights to the plurality of different types of sensors 114. Alternatively stated, the processor 204 may be configured to assign the plurality of weights to the plurality of different types of input signals captured by the plurality of different types of sensors 114.

After the pre-calibration, the processor 204 may be configured to embed a set of markers in the media item 104 which may be played by the media device 110. The set of markers may be embedded based on the expected-emotions-tagging metadata stored for the media item 104 in a memory of the calibration system 102 (as described in FIG. 1A). The set of markers may be at least one of audio markers, video markers, or frame markers. Thereafter, the media device 110 may play a scheduled/user-selected media item (for example, the media item 104) in the closed environment occupied by a target audience (or the audience 112), for which the emotional response data is intended to be captured in real time.

Data Acquisition at Media Playback:

At the media playback stage, for different granular durations of the playback (for example, 60 seconds) of the media item 104, the processor 204 may be configured to receive the plurality of different types of input signals from the plurality of different types of sensors 114. The plurality of different types of input signals may include audio signals from the set of audio sensors 114A, video signals that includes face data of the audience 112 from the set of image sensors 114B, and biometric signals from the set of biometric sensors 114C. Such plurality of different types of input signals may be stored in the memory 216 as an array of a specific size in accordance with a specific duration of the playback, for example, a signal array with "60" values may include values for "60 seconds" of input signal, where "60" denotes a maximum index value of the signal array that stores a value for a type of input signal at every second at an index position within the signal array.

In accordance with an embodiment, the plurality of different types of input signals may be processed for emotional response estimation from each type of input signal followed by an estimation of a reaction delay of the audience 112 for a specific scene of the media item 104. In accordance with another embodiment, the plurality of different types of input signals may be processed for an emotional response estimation from each type of input signal followed by an estimation of periods of highlight points and low light points in the media item 104.

Emotional Response Estimation:

The processor 204 may be configured normalize different types of input signals of different users in the audience 112, captured by the plurality of different types of sensors 114. Such normalization may be done based on a degree of expressive ability of different users of the audience 112. The processor 204 may be further configured to detect an emotional response from each user in the audience 112 based on the plurality of input video signals. Examples of the emotional response may include, but are not limited to, happy, sad, surprise, anger, fear, disgust, contempt, and neutral emotional response. The processor 204 may be further configured to measure, using the face recognizer 210, an emotional response level of the detected emotional response of different users of the audience 112 in the first time interval. The emotional response level of each user of the audience 112 may indicate a degree by which a user in the audience 112 may express an emotional response in the first time interval.

For example, the processor 204 may be configured to measure, using the face recognizer 210, the emotional response level of a smile as a response from a first user of the audience 112. The processor 204 may be further configured to assign, using the face recognizer 210, the emotional response level on a scale from "0" to "1" for the smile response from the first user. Similarly, in some instances, when a user shows a grin face, the processor 204 may assign, using the face recognizer 210, an average value for the emotional response level, i.e. a value of "0.5" for the user that shows a grin face. In other instances, when another user laughs, the processor 204 may assign, using the face recognizer 210, a maximum value of "1" for the user that laughs. The face recognizer 210 may be configured to determine the emotional response level of each of the audience 112 at a plurality of time instants within the first time interval.

In accordance with an embodiment, the processor 204 may be further configured to determine, using the face recognizer 210, a peak emotional response level associated with each user in the audience 112 at the first time interval. The peak emotional response level of each user may correspond to a time duration within which that user in the audience 112 provided a maximal emotional response. Alternatively stated, the peak emotional response of each user is the maximum emotional response level that may be measured for the respective user in the first time interval. The processor 204 may be configured to normalize the emotional response level of each user in the audience 112 with respect to emotional response levels of other users in the audience 112. The processor 204 may be configured to normalize the emotional response level of each user of the audience 112 based on the peak emotional response level associated with the respective user.

In accordance with an embodiment, the set of biometric sensors 114C of the plurality of different types of sensors 114 may be configured to capture the plurality of pulse rate signals of each user of the audience 112. Each biometric sensor of the set of biometric sensors 114C may be configured to detect a pulse rate of each user of the audience 112 at different time instances of the first time interval at playback of the media item 104. The processor 204 may be configured to determine a peak pulse rate associated with each user of the audience 112. The peak pulse rate associated with each user may correspond to a maximum pulse rate generated by the respective user at the first time interval. The processor 204 may be configured to normalize the detected pulse rate of each user of the audience 112 in the first time interval, based on the determined peak pulse rate associated with the respective user.

Emotional Response Estimation for Different Geographies:

In some embodiments, the emotional response data may be obtained for different geographical regions that may be associated with different demographic factors. Such emotional response data may be obtained from the plurality of different types of input signals recorded from different screening environments (for example, auditorium 118 or theatres) spread across different geographical regions.

A centralized server (such as the calibration system 102) may collect the plurality of different types of input signals as audience response data from different geographical locations. In such data acquisition scenario, the audience 112 for a specific geographical location may be marked prior to the playback of the media item 104, with an ethnicity for the geographical location, such as an Indian audience, a Japanese audience, an American audience, and a European audience. Thereafter, each type of input signal from the collected plurality of different types of input signals may be utilized to derive an average value for a specific emotional response data from a specific audience of the geographical locations, through a computation technique, for example, machine learning-based estimation, k-Nearest-Neighbors (k-NN) technique, and decision trees. Such computational technique may facilitate derivation of weight values for different geographical regions and for each emotional response dynamically. Such derived average values may be further utilized to calculate emotional response levels for audiences from different geographical regions, engaged with a specific genre of the media item 104. In some instances, the derived average values may be stored in an array, which may be utilized to compute weight values for a specific emotional response from different geographical locations.

In some embodiment, the emotional response data for the audience 112 from one geographical location may be utilized to simulate (or generate predicted or expected emotional response data) for other audiences from different geographical locations. Such simulated estimation of the emotional response data for different geographical regions may be done based on previously estimated emotional response data for previously screened media items.

For example, an emotional response data from an American audience for a specific scene of a media item (A) may be computed and stored within an array of "size 8" as given below, for example, in Table 4.

TABLE 4

| Happy | Sad | Angry | Disgust | Fear | Contempt | Surprise | Neutral |
|---|---|---|---|---|---|---|---|
| 0.6 | 0 | 0 | 0 | 0 | 0 | 0.1 | 0.3 |

Where a sum of different computed values for different emotional response for a given scene in the media item (A) is equal to 1. Similarly, for a different media item (B), a previously stored array may include emotional response data (for "Happy" emotion) of audiences from different geographical locations, as given below, for example, in Table 5.

TABLE 5

| Geographical Region | Emotional Response Media item (A) | Emotional Response Media item (B) |
|---|---|---|
| USA | 0.6 | 0.7 |
| India | Not Available | 0.5 |
| Japan | Not Available | 0.6 |

The processor 204 may be configured to generate emotional response data for Indian audience and the Japanese audience for the media item (A) based on the emotional response data for the media item (B). Such generation of the emotional response data may be a predicted emotional response data prior to the playback of the media item (A) for audiences in India and Japan who have not yet engaged with the media item (A). If the emotional response value for media item (A) may be represented as $EM_A$, and the emotional response value for media item (B) may be represented as $EM_B$, then the emotional response value from Indian audience for the media item (A) may be estimated as:

$$EM_A(\text{India}) = EM_A(\text{America}) \times \frac{EM_B(\text{India})}{EM_B(\text{America})}$$

$$EM_A(\text{India}) = 0.6 \times \frac{0.5}{0.7} = 0.42$$

The value "0.42" is a predicted emotional response value for a "Happy" emotional response from Indian audience for the media item (A).

Reaction Delay Estimation:

The processor 204 may be further configured to estimate a reaction delay for a first emotional response of the audience 112 captured by the plurality of different types of sensors 114 for a first scene of the media item 104. The first emotional response may be estimated with respect to a position of the first marker 106 that spans a first time slot that may correspond to the first scene in the media item 104. Similarly, the processor 204 may be configured to estimate a plurality of reaction delays for different types of emotional responses from the audience 112 for different marked scenes in the media item 104.

In some embodiments, the reaction delay may be estimated based on statistical analysis of the continuous reaction data (i.e. different durations of reaction from different users in the audience 112), which may be associated a specific reaction pattern for the audience 112. For example, a duration of emotional response from a first user (A) in the audience 112 may be greater than "1 second" or "5 seconds" and a duration of emotional response from a second user (B) in the audience 112 may be greater "1 minute". Therefore, a threshold duration of an emotional response may be set based on analysis of a normalized reaction from the audience 112, for example, threshold duration between "1 second" and "10 seconds". The calibration system 102 may continuously track a duration of emotional response from the different members of the audience 112 post the playback of the scene in the media item 104 and may further account for the extended duration of emotional response based on the threshold duration. Such threshold duration for emotion response may further vary in accordance with different demographic factors (for example, race, gender, age). For example, a sad scene may arouse a prolonged sad emotional response from the audience 112 as compared to a happy scene that may arouse a short emotional response from the audience 112. Such threshold duration for emotion response may vary in accordance with a geographical location of the audience 112. For example, in cases where the audience 112 is from a first geographical area, the sad scene may arouse a prolonged sad emotional response from the audience 112. In other cases where the audience 112 is from a second geographical area, the sad scene may arouse a short sad emotional response from the audience 112.

The processor 204 may be further configured to synchronize and overlay the normalized plurality of different input signals in a timeline that may be same as the playback timeline of the media item 104. An amalgamated audience response signal may be further generated based on the synchronized plurality of different input signals and a plurality of weight values assigned to the plurality of different types of sensors 114 that may capture the plurality of different types of input signals. A plot of the amalgamated audience response signal may include a plurality of tall peaks, with each tall peak having internal shorter peaks, which may form a Gaussian surface along the tall peak. The processor 204 may further detect and remove such internal shorter peaks to obtain a uniform Gaussian surface that may span for at least the threshold duration of the emotional response from the audience 112.

The processor 204 may further compute the reaction delay based on a difference between a marked duration for an expected emotional response from the audience 112 and a duration measured from the peaks observed in the plot of amalgamated audience response signal. For example, if the expected timestamp for an emotional response as per an inserted marker may span from "00:55:22" to "00:55:40" in the media item 104 and the measured peak in the amalgamated emotional response signal may span from "00:55:33" to "00:56:00", then processor 204 may compute the reaction delay as "00:55:33"–"00:55:22", i.e. "11 seconds". Additionally, the processor 204 may further compute the reaction delay for the emotional response based on a geographical region of the audience 112, a type of reaction, a type of scene, and a type of expected emotional response from the audience 112.

In practical situations, however, the reaction delay for each emotional response from the audience 112 may be further attributed to a set of constraints associated the plurality of different types of sensors 114 that captures the plurality of different types of input signals from the audience 112. The set of constraints may include, but are not limited to, location of audio sensors and associated phase shifts of received input signal, a sensor sensitivity to the input signal, and attenuation of the input signal in the ambient environment. In one such instance, the processor 204 may further compute a transmission delay associated with the capture and a transmission of the emotional response data from the plurality of different types of sensors 114 for the emotional response during the playback of different scenes of the media item 104. Such transmission delay may be computed with respect to a position of an associated marker of the plurality of markers that may be embedded in the media item 104. For example, a first microphone (M1) may be positioned near the audience 112 seats and a second microphone (M2) may be positioned near the first speaker of the media device 110. As the first microphone (M1) is close to the source of the input signal with respect to the second microphone (M2), thus the second microphone (M2) may receive the same input signal after a transmission delay of "0.3 milliseconds" as compared to the first microphone (M1).

Marker Calibration in Media item:

In general, the computed reaction delay and the transmission delay provide a measure of deviation of duration or timestamps for an actual emotional response from an expected duration or timestamps of the emotional response from the audience 112. Therefore, such deviation may be compensated for the media item 104 with a calibration of position of the plurality of markers by a delay equivalent to a sum of the computed reaction delay from the audience 112 and the computed transmission delay associated with the capture and reception of the plurality of different types of input signals at the plurality of different types of sensors 114. Thus, the processor 204 may be configured to calibrate the position of each marker to associate a first set of frames of a scene with an emotional response, based on at least the computed reaction delay and the computed transmission delay. The processor 204 may be further configured to perform a plurality of iterations to calibrate the plurality of markers inserted in the media item 104, in accordance with a plurality of different groups of audiences. Each iteration of the plurality of iterations may be executed by the processor 204 for a different group of the plurality of different groups of audiences.

In some embodiments, the calibration of marker may be done based on computation of the reaction delay for each type of input signal, which may be different for different types of sensors. For example, an increase in a pulse rate may occur in a relatively shorter time interval (for example, "2 seconds" after the scene is screened) with respect to a timestamp for a marker as compared to a duration for generation and capture of audio signal (for example, "5 seconds" after the scene is screened) for the same scene of the media item 104. Therefore, a common peak of the pulse rate and the audio signal may be identified to obtain a precise value of reaction delay, which may be "4 seconds" based on the reaction delay for the pulse rate and the audio signal. In some embodiments, the processor 204 may be further configured to output a portion of the media item 104 that spans a duration of a calibrated marker in the media item 104. Such outputted portion of the media item 104 may be utilized to analyze an effectiveness of an intended scene of the media item 104 for audiences that may be associated with different geographical locations and different demographics.

Highlight Point and Lowlight Point Analysis:

With numerous iterations for media calibration, the durations and timestamps for the expected emotional response may be obtained precisely with reference to precise placement of the plurality of markers in the media item 104. Such calibration may further be utilized to identify a set of highlight points and a set of lowlight points in the media item 104, using the high point analyzer 208. The set of highlight points and the set of lowlight points in the media item 104 may be identified based on analysis of processed plurality of different types of input signals that may be collected over a period.

In some embodiments, the processor 204 may be configured to compute, using the high point analyzer 208, an audio array, a video array, and a pulse array for a specific segment of the captured plurality of different types of input signals. Each of the audio array, the video array, and the pulse array may be associated with an array-size (for example, "60" for a "1 minute" of input signal, where each value is measured against a second of the input signal). Thereafter, the audio array, the video array, and the pulse array may be assigned initial weight values based on a measured accuracy of the acquisition of the plurality of different types of input signals. For example, the video array may be assigned a higher weight value if the video signal is captured in a lighted room and the audience 112 faces is exposed to significant light. Similarly, the audio array may be assigned a higher weight values if the audio signal is captured in an audio calibrated room, such as movie theatres or auditorium 118. Similarly, the pulse array may be assigned a higher weight values if the pulse rate sensor is fairly accurate for a given environment. The processor 204 may be further configured to compute a weighted sum of at least the audio array, the video array and the pulse array, to generate a weighted array for the emotional response from a user in the audience 112.

For example, for a specific user (i), if the common weight value of the audio array (A) is $W_A$, the weight value of the video array (V) is $W_V$, and the weight value of the pulse array (P) is $W_P$, then the weighted sum ($U_W$) (or amalgamated array for a specific user (i) may be as:

$$U_W(i) = A \times W_A + V \times W_V + P \times W_P$$

The processor 204 may be further configured to generate an amalgamated audience response signal ($R_A$). Such amalgamated audience response signal ($R_A$) may be generated based on addition of the plurality of different types of input signals. The addition of the plurality of different types of input signals may be preceded by a multiplication of each of the plurality of different types of input signals with the plurality of assigned weights to different associated sensors. The amalgamated audience response signal ($R_A$) may indicate the emotional response of the audience 112 with a specific duration with the playback of the media item 104. Thus, the amalgamated array ($U_W(i)$) may be iteratively added for each detected user of the audience 112 to obtained the amalgamated audience response signal ($R_A$) from the audience 112 for the media item 104, which may be given as:

$$R_A = \sum_{i=1}^{N} U_W(i)$$

A plot of the amalgamated response signal may be done to further identify a plurality of peaks and valleys over a time window (or timeline) equivalent to the array size, such as "60 seconds timeline". The processor 204 may be further configured to identify, using the highpoint analyzer, the set of highlight points in the media item 104 based on analysis of a distribution of the plurality of peaks and valleys with respect to the plurality of markers in the media item 104. Alternatively stated, the set of highlight points may be identified based on how evenly spread the points are and what were the individual values for audio, video and pulse recorded compared to the actual emotional response from the media item 104.

In some embodiments, the processor 204 may be configured to identify, using the high point analyzer 208, the set of highlight points and the set of lowlight points in the media item 104 based on a set of common positive peaks and a set of common negative peaks in each of the plurality of different types of input signals. Such set common positive peaks and common negative peaks in the plurality of different types of input signals may be identified post a synchronization and overlay of the plurality of different types of input signals in a first timeline, using the high point analyzer 208. The processor 204 may be further configured to normalize the set of common positive peaks and the set of common negative peaks in each of the plurality of different types of input signals. A plurality of intersections between each of the plurality of different types of input signals may be identified based on one or more techniques, such as a normalization technique, an extraction technique, and a classification technique. Thereafter, the set of highlight points and the set of lowlight points may be identified based on the normalized set of common positive peaks and the set of common negative peaks.

The processor 204 may be further configured to extract, using the video frame clipper 212, a set of frames from the media item 104 that may span a duration of each of the set of highlight points and the set of lowlight points in the media item 104. In certain implementation, when the media item 104 is a game file, the processor 204 may be configured to evaluate and identify, using the high point analyzer 208, the set of highlight points and the lowlight points of a video game stored in the game file, based on at least one of the audio signal, the video signal, the pulse signal, a console usage signal and the like.

Highlight Points and Lowlight Points Prediction and Validation:

In accordance with an embodiment, the processor 204 may be further configured to predict a first set of highlight points and lowlight in the media item 104 for a particular demographic group based on the execution of the plurality of iterations of the calibration stage. In certain implementations, the processor 204 may be configured to predict the first set of highlight and lowlight points for the media item 104 in the case where the audience 112 belongs to a first geographical location "AMERICA". In other implementations, the processor 204 may be configured to predict the first set of highlight and lowlight points for the media item 104 in the case where the audience 112 belongs to a second geographical location "INDIA".

The processor 204 may be further configured to verify the predicted set of highlight points and the lowlight points based on implementation of standard deviation and regression analysis on the predicted set of highlight points and the lowlight points. With such validation methods, an error component may be further estimated for each predicted highlight point or lowlight points. In some embodiments, the processor 204 may be configured to iteratively predict the set of highlight points and the lowlight points in the media item 104 with different audiences. Every time the iteratively predicted set of highlight points and the lowlight points are generated, the processor 204 may be configured to estimate the error component and verify the accuracy of the predicted set of highlight points and the lowlight points. Such verification may be further based on dynamic variation in the assignment of weight values to different types of input signals that may be captured in real time.

Media Items Comparison:

In accordance with an embodiment, the processor 204 may be further configured to compare a first media item with a second media item. The processor 204 may be further configured to identify one of the first media item and the second media item as a favorable media item. The processor 204 may be configured to compare the first media item and the second media item based on number of highlight points and lowlight points in each of the first media item and the second media item. The comparison may be further based on one of a density and distribution pattern associated with the set of highlight points and the set of lowlight points in the first media item and the second media item.

In cases where the plurality of highlight points is concentrated on one side of a first timeline of the first media item, and in cased the other side is devoid of highlight points, the processor 204 may be configured to mark the first media item as an unfavorable media item. The processor 204 may be configured to compare the first media item and the second media item based on one or more parameters such as an audio source parameter and an audio recording parameter. Examples of the audio source parameter may includes an original noise parameter, a power subtraction parameter, and a spectral subtraction parameter. Examples of the audio recording parameter may include a type of the auditorium 118. Examples of the auditorium 118 may include a calibrated auditorium, an open environment auditorium, and a recording studio based auditorium 118.

Response Simulation and Score Estimation:

In some embodiments, the processor 204 may be further configured to simulate a set of new highlight points in the media item 104 with respect to variation in parameters, such as a type of audience 112 (race or geography), a type of acquisition environment, an age, a gender, and a movie genre. For example, for acquisition of emotional response at the playback of the media item 104 for an audience, such as an Asian audience that includes female users in an age group of 18 to 30 years, the processor 204 may be required to identify subtle differences in the emotional response when the media item 104 is shown to an American audience with mostly male users in the age group of 30 to 40 years.

The processor 204 may be configured to generate the set of new highlight points for different types of audiences based on predictive analysis and comparison of the media item 104 and the emotional response with a set of scores estimated for the media item 104. For example, the set of scores may include an audio score, a video score and a distribution score. The processor 204 may be configured to assign a video score, an audio score, and a distribution score to the media item 104 based on the captured plurality of different types of input signals captured by the plurality of different types of sensors 114 at the playback of the media item 104. The processor 204 may be configured to compute the audio score based on the audio signals in the plurality of different types of input signals.

For example, the processor 204 may be configured to compute the audio score based on decibel sounds registered in the audio signals after noise cancellation. The processor 204 may be configured to execute an audio fingerprinting methodology on the audio signals to measure noise content in the audio signals. The processor 204 may be configured to generate the audio score for the media item 104 based on the measured noise signal. The processor 204 may be further configured to identify a sound of clap, a sound of boo, and a sound of a whistle based on the audio finger printing methodology. Accordingly, the processor 204 may be further configured to compute the video score and the distribution score based on the generated emotional response from different audiences, such as the audience 112.

It may be noted that the technique described for the simulation and estimation of the emotional response and calibration of media items for different audiences from different geographies and demographics may not be so limited. Thus, the aforementioned emotional response may be estimated through any suitable technique, such as an auto encoder for a new set of geography data, classifiers, extractors for emotional response data, neural network-based regression and boosted decision tree regression for emotional response data, and supervised machine learning models or deep learning models to precisely estimate value-based weight values.

Figure 3:
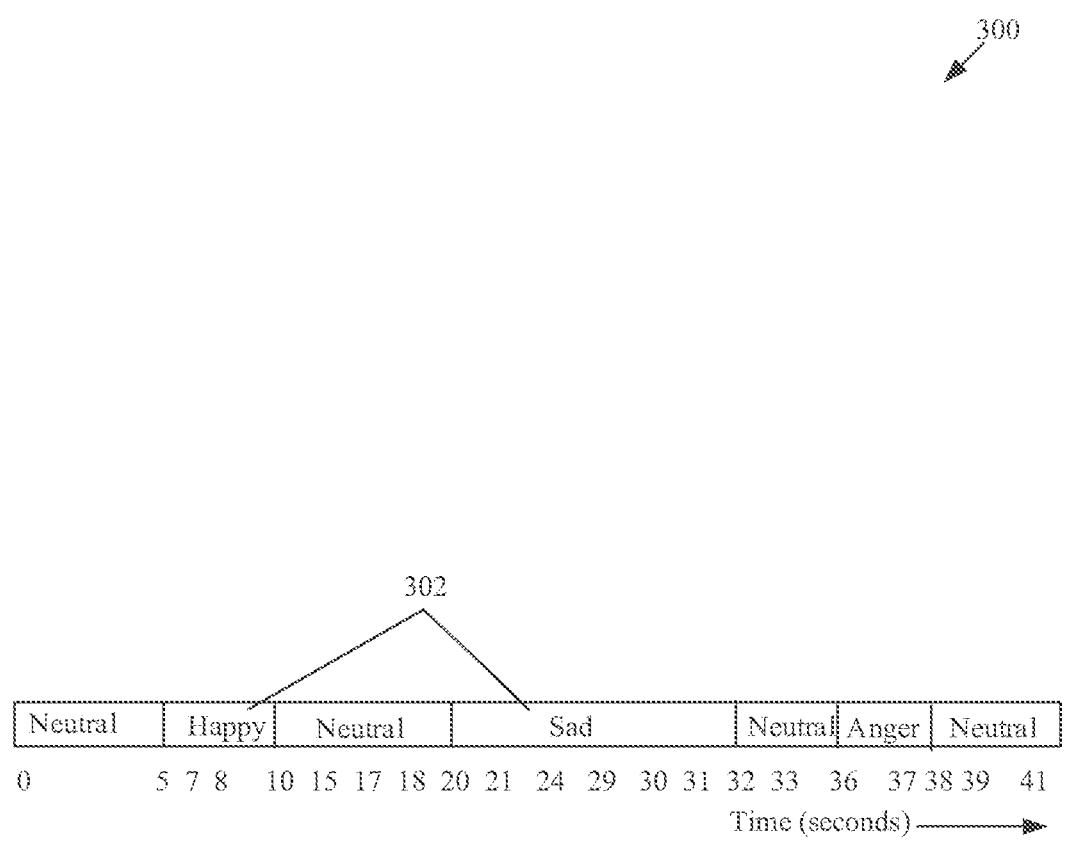
FIG. 3 illustrates a timeline of a media item associated with expected-emotions-tagging-metadata, in accordance with an embodiment of the disclosure.

FIG. 3 illustrates a timeline of a media item associated with expected-emotions-tagging-metadata, in accordance with an embodiment of the disclosure. FIG. 3 is explained in conjunction with elements from FIGS. 1 and 2. With reference to FIG. 3, there is shown a timeline 300 of a media item (such as the media item 104 (FIG. 1) and various timestamps of the media item. The media device 110 may be configured to execute playback of the media item. The timeline 300 of the media item may comprise a plurality of scenes which may correspond to a set of timeslots of the media item.

Each of the plurality of scenes may include the expected-emotions-tagging-metadata (for example, one or more emotional tags 302, such as neutral, happy, sad, and anger), along the timeline 300 of the media item. The expected-emotions-tagging metadata may indicate an associative relationship between the set of time slots and a set of specified emotional states that may be expected from the audience 112 at the set of time slots at playback of the media item. Examples of the set of specified emotional states may include, but is not limited to happy, neutral, sad, and anger.

Figure 4A:
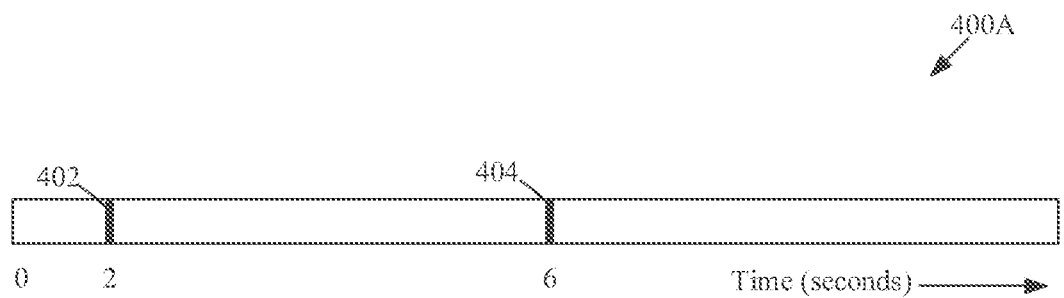
FIG. 4A illustrates a timeline of a media item inserted with a plurality of markers, in accordance with an embodiment of the disclosure.

FIG. 4A illustrates a timeline of a media item inserted with a plurality of markers, in accordance with an embodiment of the disclosure. FIG. 4A is explained in conjunction with elements from FIGS. 1, 2, and 3. With reference to FIG. 4A, there is shown a first timeline 400A of a media item (such as the media item 104 (FIG. 1)). The calibration system 102 may be configured to embed a plurality of markers at a plurality of positions of the first timeline. For example, the calibration system 102 may be configured to embed the first marker 106 at a first position 402, and the second marker 108 at a second position 404. The media device 110 may be further configured to execute a playback of the media item for the audience 112 in accordance with the first timeline 400A. The plurality of different types of sensors 114 may be configured to capture a first emotional response of the audience 112 at playback of the media item.

Figure 4B:
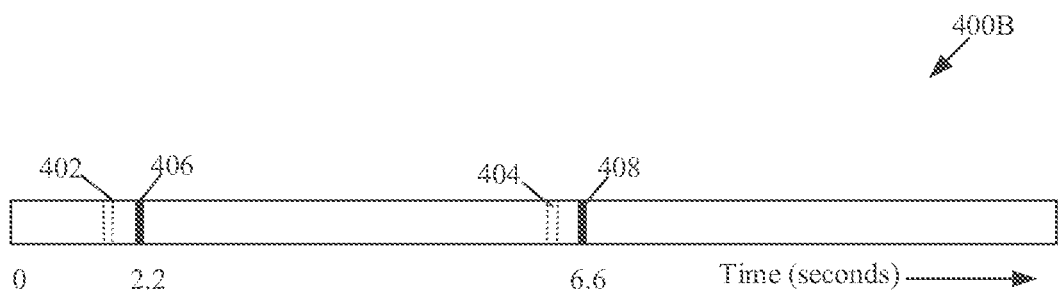
FIG. 4B illustrates a timeline of a media item with the plurality of markers calibrated from previous positions of the plurality of markers in FIG. 4A, in accordance with an embodiment of the disclosure.

FIG. 4B illustrates a timeline of a media item with the plurality of markers calibrated from previous positions of the plurality of markers in FIG. 4A, in accordance with an embodiment of the disclosure. FIG. 4B is explained in conjunction with elements from FIGS. 1, 2, 3, and 4A. With reference to FIG. 4B, there is shown a second timeline 400B of a media item (such as the media item 104 (FIG. 1)). The calibration system 102 may be configured to embed a plurality of markers into a plurality of positions of the media item, along the second timeline 400B. For example, the calibration system 102 may be configured to embed the first marker 106 at a first position 402, and the second marker 108 at a second position 404. The media device 110 may be configured to execute a playback of the media item for the audience 112. The plurality of different types of sensors 114 may be configured to capture a first emotional response of the audience 112 at playback of the media item. The calibration system 102 may be configured to compute a reaction delay for a first emotional response of the audience 112 captured by the plurality of different types of sensors 114 with respect to a position of the first marker 106 that spans a first timeslot 106A to 106B that corresponds to a first scene of the media item 104.

The first marker 106 and the second marker 108 may be located at a start timestamp and an end timestamp of the first scene in the media item. The first scene of the media item may include a first set of frames. The calibration system 102 may be further configured to calibrate position of the first marker 106 and the second marker 108 by shifting positions of the first marker 106 and the second marker 108 based on the computed reaction delay. For example, the calibration system 102 may be configured to shift position of the first marker 106 from the first position 402 to a third position 406. The calibration system 102 may be further configured to shift position of the second marker 108 from the second position 404 to a fourth position 408. The calibration system 102 may be configured to calibrate position of the first marker 106 to associate the first set of frames of the first scene with the first emotional response, based on the computed reaction delay.

Figure 5:
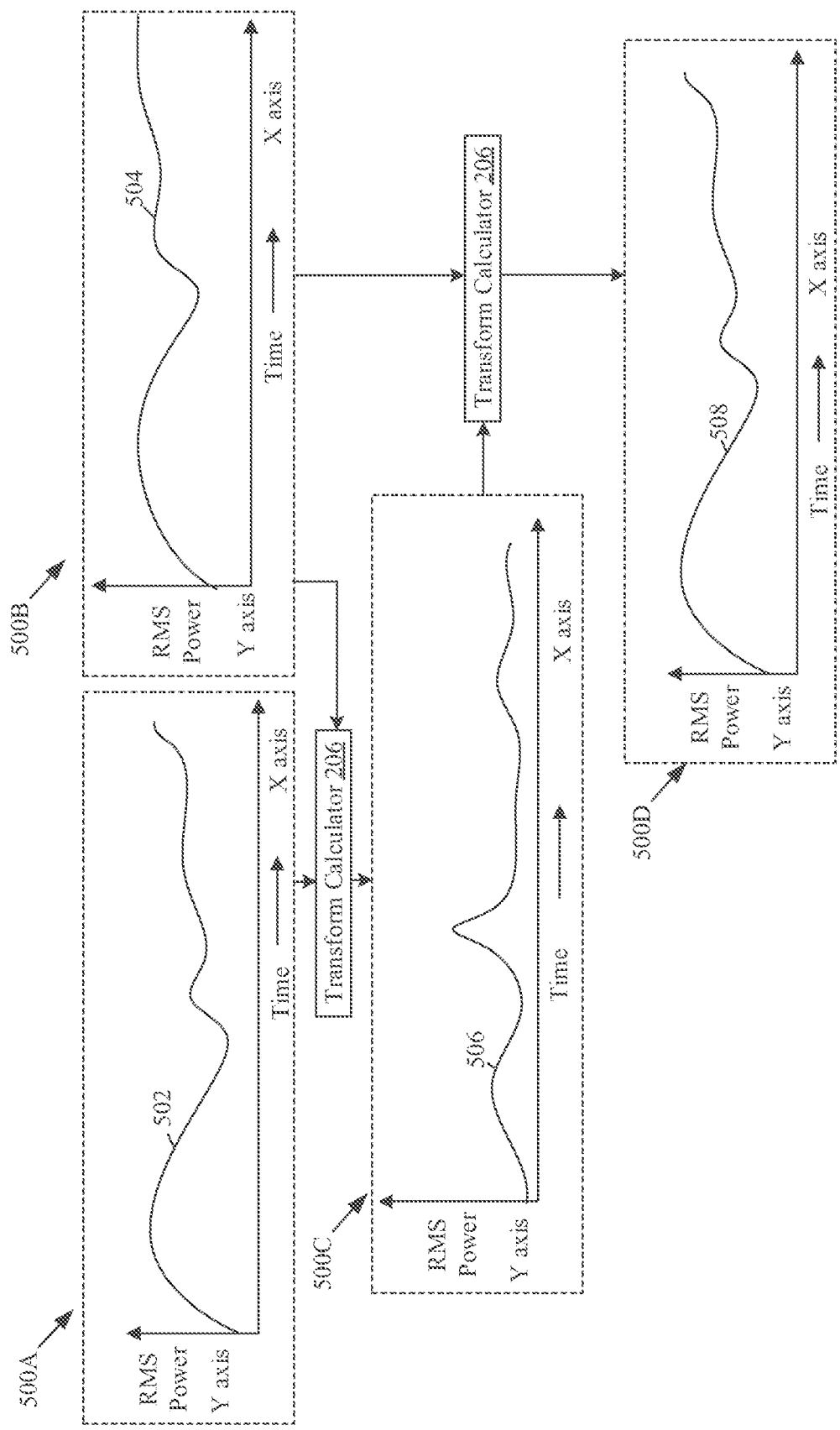
FIG. 5 illustrates a collection of graphs that show sequential transformation of different audio signals captured in a test environment, in accordance with an embodiment of the disclosure.

FIG. 5 is a collection of graphs that illustrate sequential transformation of different audio signals captured in a test environment, in accordance with an embodiment of the disclosure. FIG. 5 is explained in conjunction with elements from FIGS. 1, 2, 3, 4A, and 4B. With reference to FIG. 5, there is shown a collection of graphs that may include a first graph 500A, a second graph 500B, a third graph 500C, and a fourth graph 500D. The first graph 500A may represent a first audio signal 502 captured by the set of audio sensors 114A from a test environment in absence of the test audience 116. The first audio signal 502 may be captured when the media device 110 plays a test media item. The "X" axis of the first graph 500A may correspond to time elapsed at playback of the test media item by the media device 110. The "Y" axis may correspond to root mean square (RMS) power of the captured first audio signal 502.

The captured first audio signal 502 may include audio component of the test media item. The captured first audio signal 502 may further include a first noise signal, which may correspond to an audio noise generated in the test environment because of the acoustic properties of the test environment. For example, acoustic properties of the test environment may cause generation of echoes and reverberations of the audio signals of the test media item in the test environment. Such echoes and reverberations of the one or more audio signals may manifest as the first noise signal in the captured first audio signal 502.

The second graph 500B may correspond to a second audio signal 504 captured by the set of audio sensors 114A from the test environment in presence of the test audience 116. The second audio signal 504 may be captured when the media device 110 plays the test media item. The captured second audio signal 504 may include an audio component of the test media item and a noise component from the test audience 116 and the ambient environment. The captured second audio signal 504 may include a first noise signal which may correspond to audio noise generated in the test environment because of the acoustic properties of the test environment. For example, acoustic properties of the test environment may cause generation of echoes and reverberations of the audio signals of the test media item in the test environment. Such echoes and reverberations of the audio signals may manifest as the first noise signal in the captured second audio signal. The captured second audio signal 504 may also include a response signal from the test audience 116, which may indicate the emotional responses generated by the test audience 116. For example, the audience response signals may include a clap sound, a laughter sound, and a whistle sound from the test audience 116.

The third graph 500C may correspond to a combined noise signal 506 generated by the processor 204, using the transform calculator 206, based on the first audio signal 502 and the second audio signal 504. The "X" axis of the third graph 500C may correspond to time elapsed at playback of the test media item by the media device 110. The "Y" axis may correspond to root mean square (RMS) power of the generated combined noise signal 506. In accordance with an embodiment, the processor 204 may be configured to generate an error rate for the set of audio sensors 114A based on the generated noise signal 506. The processor 204 may be further configured to assign a specific weight to the set of audio sensors 114A based on the generated error rate.

The fourth graph 500D may represent a third audio signal 508. The third audio signal 508 may be generated by the processor 204, using the transform calculator 206, based on the generated noise signal 506 and the second audio signal 504. The processor 204 may be configured to generate the third audio signal 508, using the transform calculator 206, based on noise cancellation of the second audio signal through one of an accord audio framework method, a fast Fourier transformation method, and an independent component analysis method.

Figure 6A:
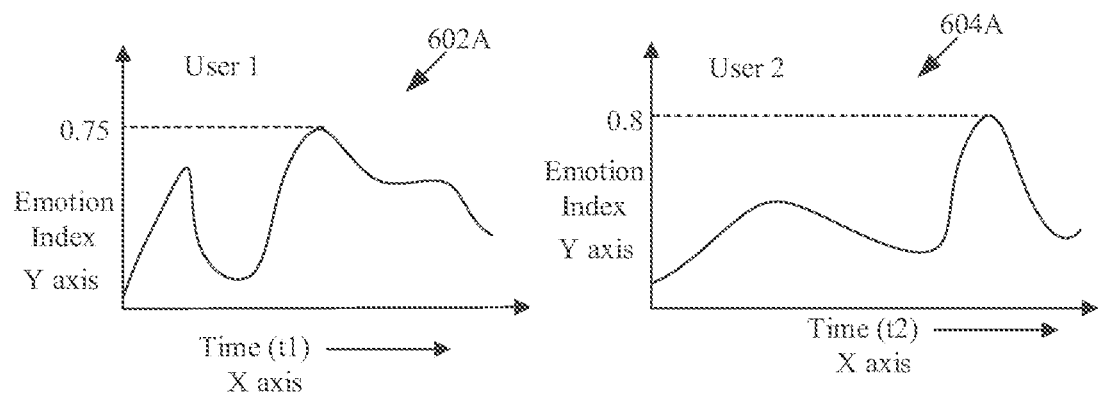
FIG. 6A illustrates a set of graphs that illustrate emotional response level of a first user and a second user, in accordance with an embodiment of the disclosure.
Figure 6B:
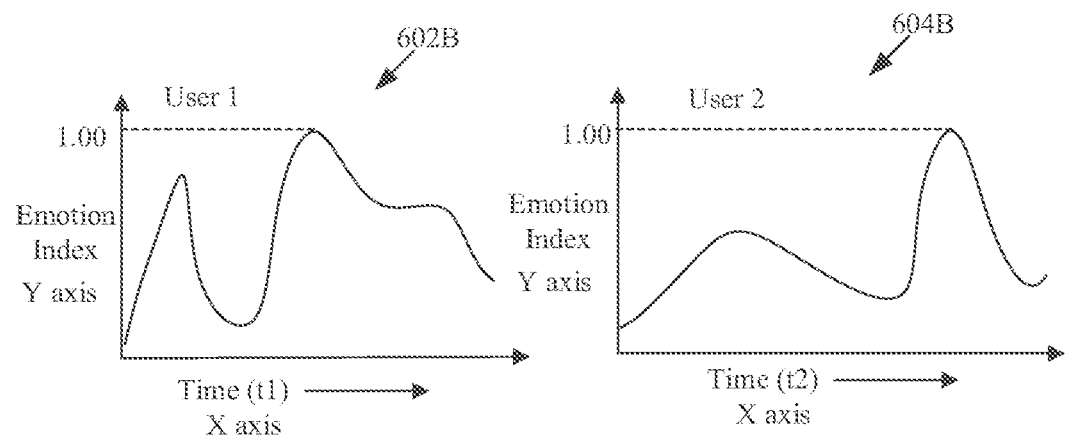
FIG. 6B illustrates a set of graphs that illustrate emotional response levels of the first user and the second user, in accordance with an embodiment of the disclosure.

FIG. 6A illustrates a set of graphs that illustrate emotional response levels of a first user and a second user, in accordance with an embodiment of the disclosure. FIG. 6A is explained in conjunction with elements from FIGS. 1, 2, 3, 4A, 4B, and 5. With reference to FIG. 6A, there are shown a graph 602A and a graph 604A. The graph 602A may represent playback time of the media item 104 at the media device 110, along the "X" axis. The graph 602A may further represent a first emotional response level of the emotional response of the first user, along the "Y" axis. Similarly, the graph 604A may represent playback time of the media item 104 at the media device 110, along the "X". The graph 604A may further represent a second emotional response level of the emotional response from the second user, along the "Y" axis.

In certain scenarios, the emotional response level of each user of the audience 112 may be represented as a fractional number between "0" and "1". The processor 204 may be configured to identify a peak emotional response level of the first user and the second user based on the first emotional response signal and the second emotional response signal respectively. The peak emotional response level of the first user may correspond to maximum value of the first emotional response signal within a first-time slot. The peak emotional response level of the second user may correspond to maximum value of the second emotional response signal within the first-time slot. For example, the peak emotional response level of the first user, as per the graph 602A may be "0.75". The peak emotional response level of the second user, as per the graph 604A may be "0.8".

The processor 204 may be configured to normalize the first emotional response level signal of the first user with the second emotional response level signal of the second user based on the peak emotion response level of the first user and the second user. The processor 204 may be configured to scale the first emotional response level signal and the second emotional response level signal of the first user and the second user such that the peak emotional response level of the first user and the second user may be "1".

FIG. 6B illustrates a set of graphs that illustrate emotional response levels of the first user and the second user, in accordance with an embodiment of the disclosure. FIG. 6B is explained in conjunction with elements from FIGS. 1, 2, 3, 4A, 4B, 5, and 6A. With reference to FIG. 6B, there is shown a graph 602B and a graph 604B. The graph 602B may represent playback time of the media item 104, along the "X" axis. The graph 602B may further represent the first emotional response level scaled by the processor 204, along the "Y" axis. Similarly, the graph 604B may represent playback time of the media item 104, along the "X" axis. The graph 604B may further represent the second emotional response level scaled by the processor 204, along the "Y" axis.

Figure 7:
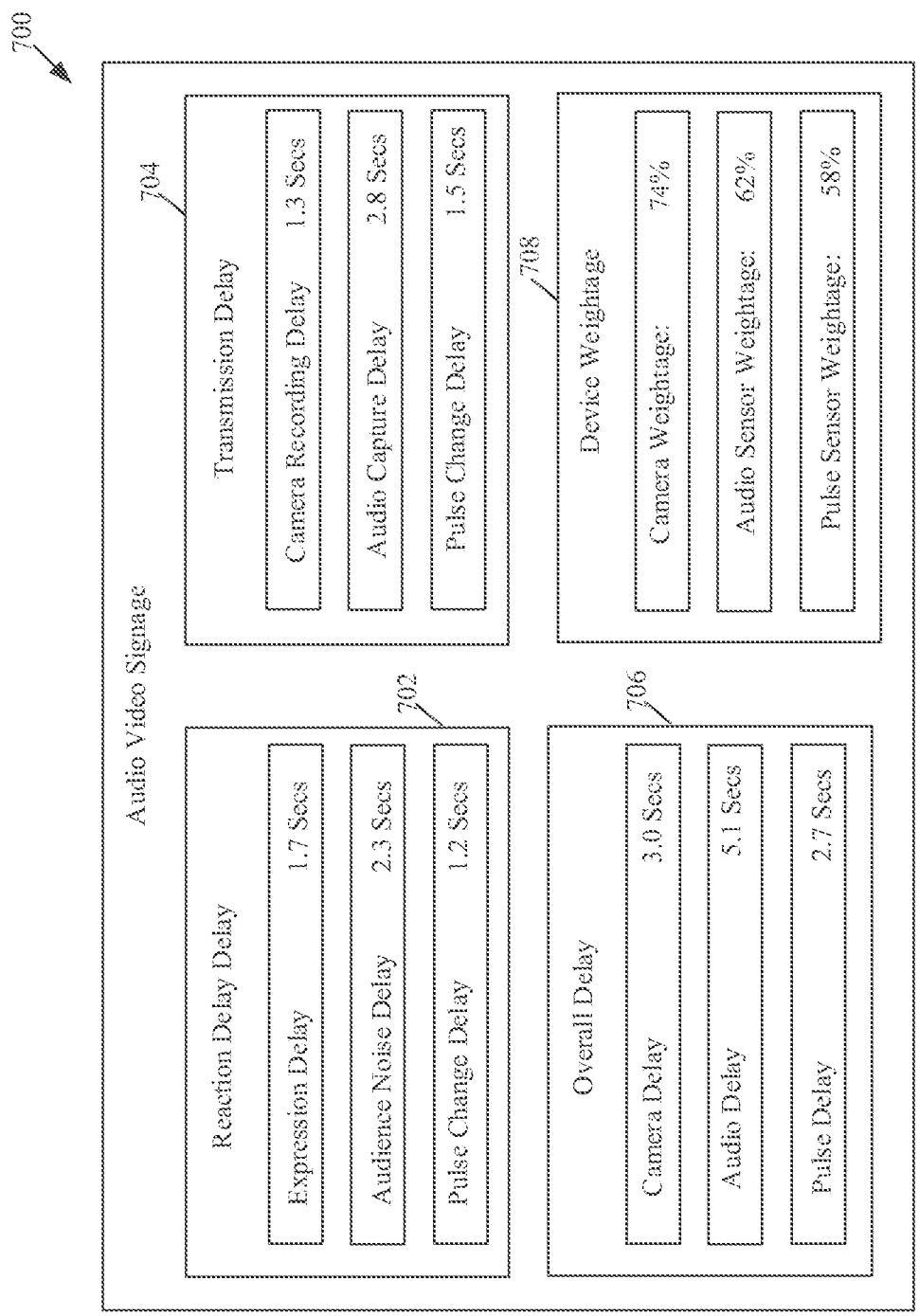
FIG. 7 illustrates an exemplary first user interface that displays reaction delays, transmission delays and device weights associated with a plurality of different types of signals, in accordance with an embodiment of the disclosure.

FIG. 7 illustrates an exemplary first user interface that displays reaction delays, transmission delays, and device weights associated with a plurality of different types of signals, in accordance with an embodiment of the disclosure. FIG. 7 is explained in conjunction with elements from FIGS. 1, 2, 3, 4A, 4B, 5, 6A, and 6B. With reference to FIG. 7, there is shown a first user interface 700. The first user interface 700 comprises a plurality of application cards, such as a first application card 702, a second application card 704, a third application card 706, and a fourth application card 708.

The first application card 702 may be configured to display the reaction delays associated with the audience 112. For example, the first application card 702 may display an expression delay, an audience noise delay, and a pulse change delay. The second application card 704 may be configured to display transmission delays associated with the plurality of different types of sensors 114. For example, the second application card 704 comprises a camera recording delay, an audio capture delay, and a pulse change delay.

The third application card 706 may be configured to display an overall delay associated with the audience 112 and the plurality of different types of sensors 114. The overall delay may be a sum of the transmission delays and the reaction delays. For example, the third application card 706 may display a camera delay, an audio delay and a pulse delay. The processor 204 may be configured to assign specific weights to each sensor of the plurality of different types of sensors 114 based on the transmission delays and the reaction delays.

The fourth application card 708 may be configured to display the weights assigned to each of the plurality of different types of sensors 114. In the case where the plurality of different types of sensors 114 comprises a camera, an audio sensor and a pulse sensor, the fourth application card 708 may display a first weight assigned to a camera, a second weight assigned to an audio sensor, and a third weight assigned to a pulse sensor.

Figure 8:
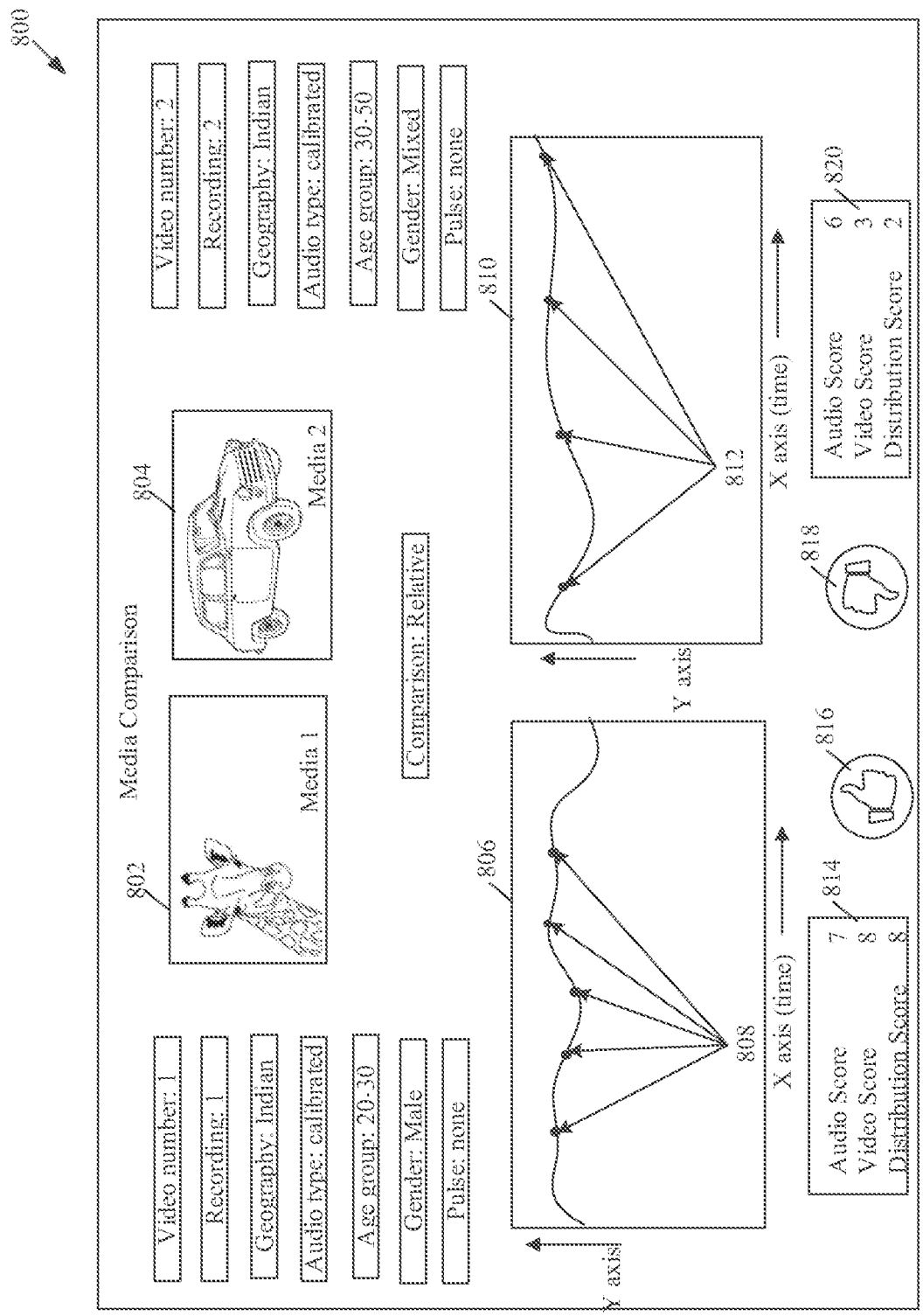
FIG. 8 illustrates an exemplary second user interface which displays results of a comparison between one or more media items, in accordance with an embodiment of the disclosure.

FIG. 8 illustrates an exemplary second user interface which displays results of a comparison between different media items, in accordance with an embodiment of the disclosure. FIG. 8 is explained in conjunction with elements from FIGS. 1, 2, 3, 4A, 4B, 5, 6A, 6B, and 7. With reference to FIG. 8, there is shown a second user interface 800. The second user interface 800 may be configured to display a comparative result between a first media item 802 and a second media item 804. The second user interface 800 may further comprise a first graph 806, a second graph 810, a first application card 814, a first icon 816, a second icon 818, and a second application card 820.

The second user interface 800 may present information associated with metadata of the first media item 802 and the second media item 804 to the user. Examples of the metadata of the first media item 802 and the second media item 804 may include a video number, a recording number, a geographical area, and an audio type, and the like. The second user interface 800 may further display a set of data items associated with the audience 112 who engages with the first media item 802 and the second media item 804, such as an age group, a gender, and a pulse rate of the audience 112.

The first graph 806 may represent playback duration of the first media item 802, along the "X" axis and further represent an amalgamated audience response signal associated with playback of the first media item 802 at the media device 110, the "Y" axis. Similarly, the second graph 810 may represent playback duration of the second media item 804, along the "X" axis and further represent another amalgamated audience response signal associated with playback of the second media item 804 at the media device 110, along the "Y" axis.

In accordance with an embodiment, the processor 204 may be configured to identify, using the high point analyzer 208, a first set of highlight points 808 in the first media item 802 based on the age group, the gender, and the pulse rate of the audience 112. The processor 204 may be configured to identify, using the high point analyzer 208, a second set of highlight points 812 in the second media item 804 based on the age group, the gender, and the pulse rate of the audience 112. The processor 204 may be further configured to compute an audio score, a video score and a distribution score for the first media item 802 and the second media item 804 based on the first set of highlight points 808 and the second set of highlight points 812. The first application card 814 may be configured to present the audio score, the video score, and the distribution score of the first media item 802 to a user, such as a content producer of the first media item 802 or the second media item 804.

The second application card 820 may display the audio score, the video score, and the distribution score of the second media item 804. In accordance with an embodiment, the processor 204 may be configured to identify one of the first media item 802 and the second media item 804 as a favorable media item. In accordance with another embodiment, the processor 204 may be configured to identify one of the first media item 802 and the second media item 804 as an unfavorable media item. The first icon 816 may be utilized by a user to indicate that the first media item 802 may be the favorable media item. Accordingly, the second icon 818 may be utilized to indicate that the second media item 804 may be an unfavorable media item.

Figure 9:
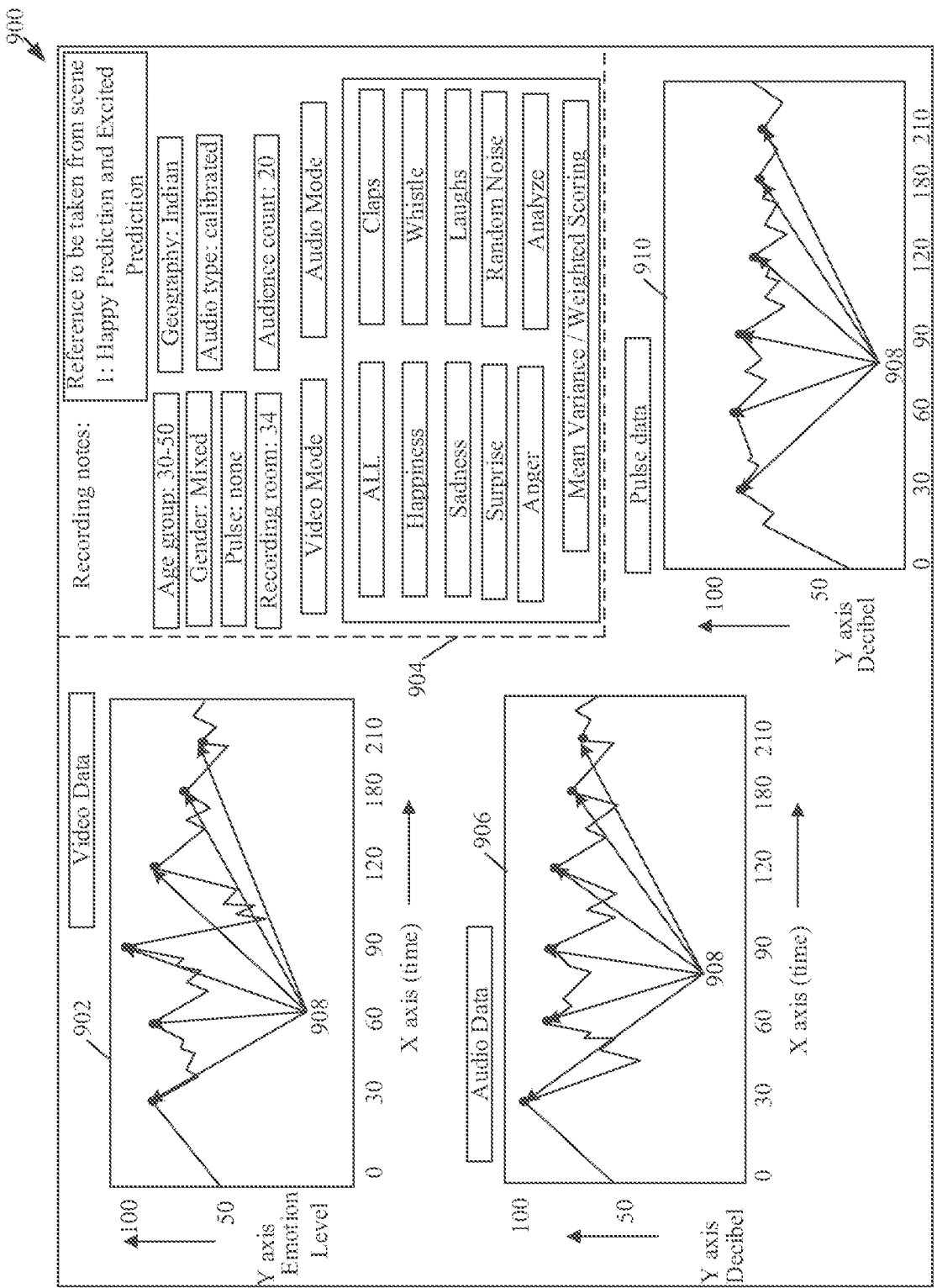
FIG. 9 illustrates an exemplary third user interface, which illustrates peak points in a video signal and an audio signal associated with a media item, in accordance with an embodiment of the disclosure.

FIG. 9 illustrates an exemplary third user interface that illustrates peak points in a video signal and an audio signal associated with a media item, in accordance with an embodiment of the disclosure. FIG. 9 is explained in conjunction with elements from FIGS. 1, 2, 3, 4A, 4B, 5, 6A, 6B, 7, and 8. With reference to FIG. 9, there is shown a third user interface 900. The third user interface 900 comprises a first graph 902, an application card 904, and a second graph 906. In accordance with an embodiment, the set of image sensors 114B and the set of audio sensors 114A of the plurality of different types of sensors 114 may be configured to capture a video signal and an audio signal from the audience 112 at playback of the media item 104.

The first graph 902 may represent the captured video signal and the second graph 906 may represent the captured audio signal. The processor 204 may be further configured identify a plurality of peak points 908 in the video signal and the audio signal based on a set of parameters. In some embodiments, the plurality of different types of sensors 114 may be configured to capture a pulse signal from the audience 112. The third user interface 900 may comprise a third graph 910 to represent the captured pulse signal. The processor 204 may be further configured identify the plurality of peak points 908 in the pulse signal based on the set of parameters.

The plurality of peak points in the video signal and the audio signal may indicate time instants at which the audience 112 may generate an emotional response to playback of the media item 104. The application card 904 displays the set of parameters based on which the processor 204 may identify the plurality of peak points 908. For example, the application card 904 displays various parameters such as an age group, a geographical location, a gender distribution of the audience 112. The application card 904 further displays various emotional responses generated by the audience 112, such as a clap, a whistle, and a laughter.

Figure 10:
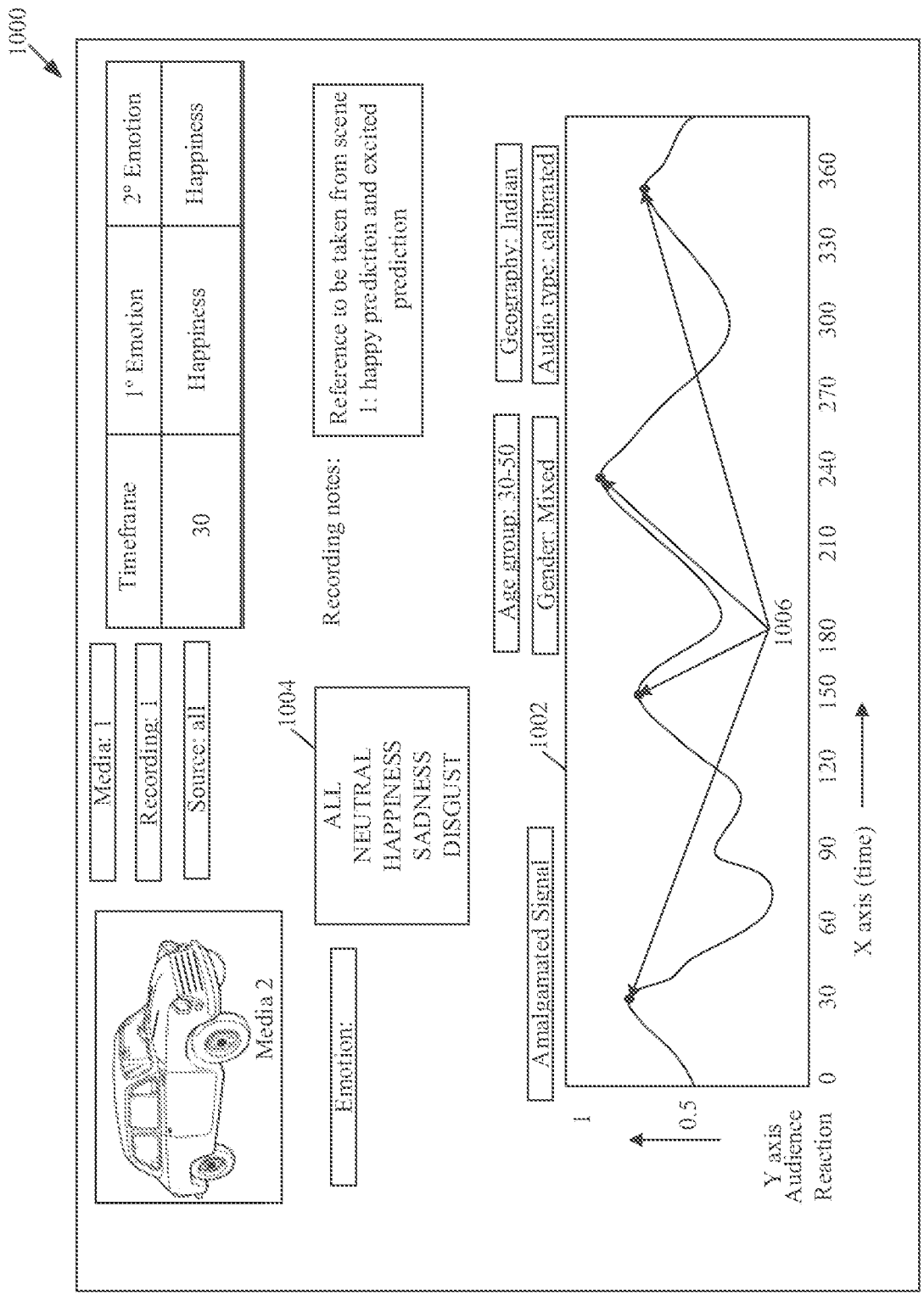
FIG. 10 illustrates an exemplary a fourth user interface, which illustrates an amalgamated audience response signal, in accordance with an embodiment of the disclosure.

FIG. 10 illustrates an exemplary fourth user interface, which illustrates an amalgamated audience response signal, in accordance with an embodiment of the disclosure. FIG. 10 is explained in conjunction with elements from FIGS. 1, 2, 3, 4A, 4B, 5, 6A, 6B, 7, 8, and 9. With reference to FIG. 10, there is shown a fourth user interface 1000. The fourth user interface 1000 comprises a first graph 1002, which represents the amalgamated audience response signal of the audience 112.

The amalgamated audience response signal may be associated with one or more emotional states of a set of defined emotional states. The fourth user interface 1000 further comprises an application card 1004 to display the set of defined emotional states such as happiness, sadness and disgust. The fourth user interface 1000 may be utilized as a dashboard interface to visualize the amalgamated emotional response data of different audiences by different users, such as content owners, content creators/producers, or content distributors. The fourth user interface 1000 may display a plurality of highlight points 1006 of the amalgamated audience response signal represented in the first graph 1002. The first graph 1002 may be a dynamic moving chart which represents a value of the amalgamated audience response signal at a particular timestamp (of the media item 104), when the respective timestamp of the media item 104 may be played. The fourth user interface 1000 may enable a user to fast forward and/or seek a plurality of timestamps of the media item 104. In cases where the user fast forwards and/or seek seeks to a particular timestamp of the media item 104, the first graph 1002 may represent the amalgamated audience response signal of the audience 112 at the respective timestamp of the media item 104.

FIG. 11 illustrates an exemplary fifth user interface, which illustrates a plurality of highlight points of a media item, in accordance with an embodiment of the disclosure. FIG. 11 is explained in conjunction with elements from FIGS. 1, 2, 3, 4A, 4B, 5, 6A, 6B, 7, 8, 9, and 10. FIG. 11 illustrates a fifth user interface 1100. The fifth user interface 1100 comprises a first graph 1102, which represents an amalgamated audience response signal associated with the audience 112. The amalgamated audience response signal may be associated with one or more emotional states of a set of defined emotional states. The processor 204 may be configured to identify a set of highlight points 1108 of the media item 104 based on the amalgamated audience response signal. The fifth user interface 1100 may further comprise a first application card 1104 and a second application card 1106.

In accordance with an embodiment, the processor 204 may be configured to identify, using the high point analyzer 208, the set of highlight points 1108 in the media item 104 based on the amalgamated audience response signal. The processor 204 may be configured to select, using the video frame clipper 212, a set of frames of the media item 104 which may correspond to the set of highlight points 1108. The first application card 1104 may depict the selected set of frames. The second application card 1106 may be configured to display metadata associated with the media item 104 and demographical data associated with the audience 112.

FIGS. 12A, 12B, 12C, 12D, and 12E collectively depict a flow chart that illustrates an exemplary method for calibration for audience response capture and analysis of media content, in accordance with an embodiment of the disclosure. With reference to FIGS. 12A, 12B, 12C, 12D, and 12E, there is shown a flow chart 1200. The flow chart is described in conjunction with FIGS. 1, 2, 3, 4A, 4B, 5, 6A, 6B, 7, 8, 9, 10, and 11. The method starts at step 1202 and proceeds to step 1204.

At 1204, the test media item to be played by the media device 110 may be stored in the memory 216. Examples of the test media item may comprise a video file, an audio file, and a game file. The processor 204 may be configured to store the test media item in the memory 216 of the calibration system 102. The memory 216 may be further configured to store expected-emotions-tagging metadata for the test media item. In certain scenarios, the expected-emotions-tagging metadata may be stored within the test media item. The expected-emotions-tagging metadata may indicate an associative relationship between a set of time slots and a set of specified emotional states that may be expected from the test audience 116 at the set of time slots at playback of the test media item.

At 1206, it may be checked if the pre-calibration of each of the plurality of different types of sensors 114 have been done (or executed) by the calibration system 102. In cases where the pre-calibration of the plurality of different types of sensors 114 is done by the calibration system 102, the control may pass to step 1234. In cases where, the pre-calibration of the plurality of different types of sensors 114 may not be done by the calibration system 102, a first set of operations (such as 1208, 1210, 1212, and 1214), may be processed concurrently with a second set of operations (such as 1216, 1218, 1220, 1222, 1224, and 1226) and a third set of operations (such as 1228, 1230, and 1232).

The first set of operations (such as 1208, 1210, 1212, and 1214) may correspond to the audio sensor pre-calibration method. The calibration system 102 may be configured to execute the audio sensor pre-calibration method to perform the pre-calibration of the set of audio sensors 114A. The second set of operations (such as 1216, 1218, 1220, 1222, 1224, and 1226) may correspond to the image sensor pre-calibration method. The calibration system 102 may be configured to execute the image sensor pre-calibration method to perform the pre-calibration of the set of image sensors 1148. The third set of operations (such as 1228, 1230, and 1232) may indicate the biometric sensor pre-calibration method. The calibration system 102 may be configured to execute the biometric sensor pre-calibration method to perform the pre-screening calibration of the set of biometric sensors 114C. The control may simultaneously pass to 1208, 1216, and 1228.

At 1208, the first audio signal may be captured in the test environment in presence of the test audience 116. The set of audio sensors 114A of the plurality of different types of sensors 114 may be configured to capture the first audio signal from the test environment. The media device 110 may be configured to play the test media item to the test audience 116 in the test environment. The test media item may comprise one or more audio signals, which may be output by the media device 110 when the media device 110 plays the test media item. The test audience 116 may consume (watch, listen and/or play) the test media item using the media device 110. The test audience 116 may generate one or more emotional responses (such as chatter, laughter, clapping, and whistles) based on playback of the media item 104 by the media device 110.

The processor 204 may be configured to receive the first audio signal from the set of audio sensors 114A. The captured first audio signal may comprise one or more audio signals which correspond to the test media item. The captured first audio signal may further comprise a first noise signal which may correspond to audio noise generated in the test environment because of the acoustic properties of the test environment. For example, acoustic properties of the test environment may cause generation of echoes and reverberations of the one or more audio signals of the test media item in the test environment. Such echoes and reverberations of the one or more audio signals may manifest as the first noise signal in the captured first audio signal. The captured first audio signals may also comprise an audience noise signal which may indicate the one or more emotional responses generated by the test audience 116. The audience noise signal may comprise a sound of clapping, a sound of laughter and a sound of whistling and any other type sounds which may indicate an audience response At 1210, the second audio signal may be captured from the test environment in the absence of the test audience 116. The set of audio sensors 114A may be configured to capture the second audio signal from the test environment such as an empty auditorium. The processor 204 may be configured to receive the captured second audio signal from the set of audio sensors 114A of the plurality of different types of sensors 114. The captured second audio signal may comprise the one or more audio signals associated with the test media item. The captured second audio signal may further comprise the first noise signal generated due to the acoustic properties of the test environment.

At 1212, a noise signal may be generated at least based on difference between the first audio signal and the second audio signal. The transform calculator 206 may be configured to generate the noise signal based on the captured first audio signal and the captured second audio signal. In certain scenarios, the processor 204 may be configured to compute a first accuracy score for each of the set of audio sensors 114A based on the generated noise signal.

At 1214, weight may be assigned to each of the set of audio sensors 114A based on the generated noise signal. The processor 204 may be configured to assign the weight to each of the set of audio sensors 114A for pre-screening calibration of the set of audio sensors 114A based on the generated noise signal. The processor 204 may be configured to assign the weights to each of the set of audio sensors 114A further based on the computed first accuracy score of each of the set of audio sensors 114A.

At 1216, a set of faces from the test audience 116 may be tracked by each image sensor of the set of image sensors 114B. The face recognizer 210 of the calibration system 102 may be configured to track the set of faces of the test audience 116 at a defined playback time period of the test media item. The processor 204 may be configured to execute the pre-calibration of the set of image sensors 1148 using the face recognizer 210.

At 1218, a first number of faces from the test audience 116 may be detected. Each image sensors of the set of image sensors 1148 may be configured to record the first number of faces. The face recognizer 210 may be configured to detect the first number of faces from the test audience 116 by each image sensor of the set of image sensors 1148 when a first frame the test media item is played by the media device 110.

At 1220, a second number of faces from the test audience 116 may be detected. Each image sensor of the set of image sensors 1148 may detect the second number of faces when a second frame of the test media item is played by the media device 110.

At 1222 a number of faces of the test audience 116 that are missed to be detected between two image frames at the time of playback of the test media item may be computed. The processor 204 may be configured to compute the number of faces that may be missed out using the face recognizer 210.

At 1224, an error rate for each image sensor of the set of image sensors 1148 may be determined. The processor 204 may be configured to determine the error rate based on a change in number of faces detected for at least two image frames of the test media item. In some embodiments, the processor 204 may be configured to compute a second accuracy score for each of the set of image sensors 1148 based on the determined error rate of each of the set of image sensors 1148.

At 1226, a weight may be assigned to each of the set of image sensors 1148 for based on the generated error rate. The processor 204 may be configured to assign weight to each of the set of image sensors 1148 based on the generated error rate. The processor 204 may be configured to assign the weights to each of the set of image sensors 1148 further based on the computed second accuracy score of each of the set of image sensors 1148.

At 1228, a standard deviation in measured biometric data of the test audience 116 may be measured. An example of the measured biometric data may include pulse rate of each user of the test audience 116. The set of biometric sensors 114C of the plurality of different types of sensors 114 may be configured to measure the biometric data of the test audience 116 at playback of the test media item by the media device 110.

At 1230, a difference in the measured biometric data of each user of the test audience 116 may be determined with respect to the determined standard deviation. The processor 204 may be configured to determine the difference in the measured biometric data of each user of the test audience 116 with respect to the determined standard deviation in the measured biometric data. In some embodiments, the processor 204 may be configured to compute a third accuracy score for each of the set of biometric sensors 114C based on the determined difference of each of the set of image sensors 114B.

At 1232, a weight may be assigned to each biometric sensor of the set of biometric sensors 114C for the pre-calibration of the set of biometric sensors 114C, based on a difference in measured biometric data, such as pulse rates, of each user of the test audience 116 with respect to the determined standard deviation. The processor 204 may be configured to assign the weight to each biometric sensor of the set of biometric sensors 114C. The processor 204 may be configured to assign the weights to each of the set of image sensors 114B further based on the computed third accuracy score of each of the set of biometric sensors 114C. Alternatively stated, each of the plurality of different types of sensors 114 may be weighted based on a plurality of accuracy scores (the first accuracy score, the second accuracy score, and the third accuracy score) of the respective type of sensor. The plurality of different types of input signals from the plurality of different types of sensors 114 may be weighted based on the plurality of accuracy scores assigned to each of the plurality of different types of sensors 114.

At 1234, the media item 104 and expected emotions-marker metadata for the media item 104 may be stored in the memory 216. The processor 204 may be configured to store the media item 104 and the expected emotions-marker in the memory 216. In certain scenarios, the processor 204 may be configured to expected emotions-marker in the media item 104. The expected emotions-tagging metadata may include an associative relationship between a set of time slots and a set of specified emotional states that are expected from the audience 112 at the set of time slots in playback of the media item 104.

At 1236, a plurality of markers may be embedded in the media item 104 that is played by the media device 110, based on expected emotions-tagging metadata. The processor 204 may be configured to embed the plurality of markers in one or more positions, such as the first timeslot 106A to 106B.

At 1238, a plurality of segments of the media item 104 may be categorized with a corresponding emotion of a set of specified emotional states. The processor 204 may be configured to categorize the plurality of segments of the media item 104 based on the embedding of the plurality of markers in the media item 104 by the processor 204.

At 1240, the plurality of different types of input signals may be received from the plurality of different types of sensors 114. The plurality of different types of input signals may correspond to the emotional response data of the audience 112 at playback of the media item 104. The processor 204 may be configured to receive the plurality of different types of signals from the plurality of different types of sensors 114.

At 1242, a reaction delay for a first emotional response captured from the audience 112 by the plurality of different types of sensors 114 may be computed. The processor 204 may be configured to compute the reaction delay for the first emotional response for a first scene of the media item 104 with respect to a position of the first marker 106 of the plurality of markers embedded in the media item 104. The position of the first marker 106 may correspond to the first time slot 106a and 106b, which corresponds to the first scene. The reaction delay be a combination of a facial expression delay, an audience noise delay, and a biometric data measurement change delay. Further, the processor 204 may be configured to compute the reaction delay for the first emotional response based on a geographical region of the audience 112, a type of reaction, a type of scene, and a type of expected response.

At 1244, a transmission delay associated with capture and transmission of emotional response data by the plurality of different types of sensors 114 may be computed. The emotional response data may be captured from the audience 112 at playback of the first scene of the media item 104. The processor 204 may be configured to compute the transmission delay for the first emotional response for a first scene of the media item 104 with respect to a position of the first marker 106 of the plurality of markers embedded in the media item 104. The transmission delay may be a combination of an image sensor recording delay, an audio capture delay, and/or biometric data capture delay. The processor 204 may be configured to compute the transmission delay further based on positioning of the plurality of different types of sensors 114 that captures the audience reaction data, and the plurality of weights assigned to the plurality of different types of sensors 114.

At 1246, a peak emotional response level for each emotion for each user of the audience 112 may be determined. The face recognizer 210 may be configured to compute the peak emotional response level based on the captured emotional response data by the plurality of different types of sensors 114.

At 1248, the received plurality of different input signals may be normalized based on the determined peak emotional response level for each emotion for each user at playback of the media item 104. The processor 204 may be configured to determine the peak emotional response level further based on a plurality of control parameters associated with the audience 112. The plurality of control parameters may include a geographical location of the audience 112. The plurality of control parameters may further include age, gender, and race of the audience 112.

At 1250, the normalized plurality of different input signals may be synchronized and overlaid in a timeline that is same as a playback timeline of the media item 104. The processor 204 may be configured to synchronize and overlay the normalized plurality of different input signals in the timeline which may be same as the playback timeline of the media item 104.

At 1252, the amalgamated audience response signal may be generated. The processor 204 may be configured to generate the amalgamated audience response signal based on the synchronized and overlaid normalized plurality of different input signals and the plurality of weights assigned to the plurality of different types of sensors 114.

At 1254, a set of common positive peaks and a set of common negative peaks may be identified in each of the plurality of different types of input signals. The processor 204 may be configured to identify the set of common positive peaks and the set of common negative peaks based on the overlay of the plurality of different types of input signals.

At 1256, a plurality of highpoints and a plurality of lowlight points for a plurality of scenes of the media item 104 may be calculated. The processor 204 may be configured to calculate the plurality of highlight points and the plurality of lowlight points based on the identified set of common positive peaks and the identified set of common negative peaks At 1258, the position of the first marker 106 may be calibrated to associate a first set of frames of the first scene with the first emotion emotional response based on the computed reaction delay and the computed transmission delay. The processor 204 may be configured to calibrate the position of the At 1260, a first timestamp of a first highlight point of the plurality of calculated highlight points may be shifted to a second timestamp based on the computed reaction delay and the transmission delay. The processor 204 may be configured to shift the first timestamp of the first highlight point of the plurality of calculated highlight points to the second timestamp.

At 1262, a first timestamp of a first lowlight point of the plurality of calculated lowlight points to may be shifted to a second timestamp based on the computed reaction delay and the transmission delay. The processor 204 may be configured to shift the first timestamp of the first lowlight point of the plurality of calculated lowlight points to the second timestamp.

At 1264, a set of new highlight points and a set of new lowlight points in the media item 104 may be predicted based on a change in control parameters using a simulation engine. The control parameters may include a geographical region, a race, a physical dimension of recording room, an age, a gender, a genre of the media item 104.

At 1266, a first media item may be compared with a second media item using the simulation engine based on a video score, an audio score, and a distribution score. The video score, the audio score, and the distribution score may be generated using the simulation engine based on the capture of emotion response data. In certain scenarios, the video score, the audio score, and the distribution score may be generated further based on the plurality of accuracy scores of the plurality of different types of sensors 114.

At 1268, a first set of highlight points and a second set of lowlight points in the media item 104 may be predicted. The processor 204 may be configured to predict the first set of highlight points and the second set of lowlight points based on a change in control parameters using a simulation engine, wherein the control parameters include a geographical region, a race, a physical dimension of recording room, an age, a gender, a genre of the media item 104. The control passes to end 1270.

Various embodiments of the disclosure may provide a non-transitory computer readable medium and/or storage medium, and/or a non-transitory machine readable medium and/or storage medium having stored thereon, a machine code and/or a set of instructions executable by a machine, such as a computer. The set of instructions in the calibration system 102 may cause the machine and/or computer to perform the operations to store the media item 104 and expected-emotions-tagging metadata for the media item 104. The expected-emotions-tagging metadata may indicate an associative relationship between a set of time slots and a set of specified emotional states that are expected from the audience 112 at the set of time slots at playback of the media item 104. The media device 110 may execute the playback of the media item 104 to the audience 112. The plurality of different types of sensors 114 may be configured to capture emotional response data from the audience 112 at the playback of the media item 104. The control circuitry 202 may embed the first marker 106 in the media item 104 played by the media device 110 based on the expected-emotions-tagging metadata. A reaction delay for a first emotional response of the audience 112 may be computed based on a capture of the plurality of different types of sensors 114 for a first scene of the media item 104 with respect to a position of the first marker 106 that spans the first timeslot 106A to 1068 that corresponds to the first scene in the media item 104. The position of the first marker 106 to associate a first set of frames of the first scene with the first emotional response may be calibrated based on at least the computed reaction delay.

Exemplary aspects of the disclosure may include a calibration system 102 (such as the calibration system 102 (FIG. 1), which may further include a memory (such as the memory 216 (FIG. 2) configured to store a media item (such as the media item 104) and expected-emotions-tagging metadata for the media item 104. The expected-emotions-tagging metadata may include an associative relationship between a set of time slots and a set of specified emotional states that may be expected from an audience (such as the audience 112 (FIG. 1)) in the set of time slots at playback of the media item 104. The calibration system 102 may further include a media device (such as the media device 110) configured for a playback the media item 104 to an audience and a plurality of different types of sensors 114 configured to capture emotional response data from the audience 112 at the playback of the media item 104. Further, the calibration system 102 may include a control circuitry (such as the control circuitry 202 (FIG. 2)) that may be configured to embed the first marker 106 in the media item 104 played by the media device 110. The first marker 106 may be embedded in the media item 104 based on the expected-emotions-tagging metadata. The control circuitry 202 of the calibration system 102 may be further configured to compute a reaction delay for a first emotional response of the audience 112 captured by the plurality of different types of sensors 114. Such reaction delay may be computed for a first scene of the media item 104 with respect to a position of the first marker 106 that may span a first time slot. Such first time slot may correspond to the first scene in the media item 104. The control circuitry 202 may be further configured to calibrate the position of the first marker 106 to associate a first set of frames of the first scene with the first emotional response. The association of the first set of frames with the first scene may be done based on at least the computed reaction delay.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. A calibration system for media content, the calibration system comprising:
a memory configured to store a media item and expected-emotions-tagging metadata for the media item, wherein the expected-emotions-tagging metadata indicates an associative relationship between a set of time slots for playback of the media item and a set of specified emotional states that are expected from an audience at the set of time slots during the playback of the media item;
a media device configured to execute the playback of the media item to the audience;
a plurality of different types of sensors configured to capture emotional response data from the audience at the playback of the media item; and
control circuitry configured to:
embed a marker in the media item based on the expected-emotions-tagging metadata,
wherein the marker corresponds to a time period, within a first time slot of the set of time slots, that includes a start time of a specified emotional state of the set of specified emotional states and an end time of the specified emotional state;
compute a reaction delay for a emotional response of the audience based on a position of the marker, wherein
the emotional response is captured by the plurality of different types of sensors for a scene of the media item, and
the marker spans in the first time slot that corresponds to the scene;
compute a transmission delay for the emotional response at the playback of the scene of the media item, wherein the transmission delay is associated with at least one of a capture of the emotional response data from the plurality of different types of sensors or a transmission of the emotional response data from the plurality of different types of sensors; and
calibrate the position of the marker to associate a set of frames of the scene with the emotional response, based on the computed reaction delay and the computed transmission delay.

2. The calibration system of claim 1, wherein
the plurality of different types of sensors includes a set of audio sensors, a set of image sensors, and a set of biometric sensors; and
the control circuitry is further configured to assign a weight to each sensor of the plurality of different types of sensors prior to the playback of the media item.

3. The calibration system of claim 2, wherein the control circuitry is further configured to pre-calibrate the plurality of different types of sensors before the playback of the media item, for the capture of the emotional response data from the audience at the playback of the media item.

4. The calibration system of claim 2, wherein
the control circuitry is further configured to pre-calibrate the set of audio sensors before the playback of the media item by the media device, and
the set of audio sensors is pre-calibrated based on playback of a test media item by the media device in a presence of a test audience in a test environment and an absence of the test audience in the test environment.

5. The calibration system of claim 4, wherein
the set of audio sensors is configured to:
capture a first audio signal in the presence of the test audience in the test environment; and
capture a second audio signal in the absence of the test audience in the test environment; and
the control circuitry is further configured to:
generate a noise signal based on at least a difference between the first audio signal and the second audio signal; and
assign the weight to each audio sensor of the set of audio sensors based on the generated noise signal, for the pre-calibration of the set of audio sensors.

6. The calibration system of claim 2,
wherein the control circuitry is further configured to pre-calibrate the set of image sensors of the plurality of different types of sensors before the playback of the media item by the media device, and
the set of image sensors is pre-calibrated based on playback of a test media item by the media device in a test environment in presence of a test audience.

7. The calibration system of claim 6, wherein the control circuitry is further configured to compute a number of faces that is undetected between at least two image frames at the playback of the test media item.

8. The calibration system of claim 7, wherein the control circuitry is further configured to:
detect a first set of faces for a first image frame of the at least two image frames at the playback of the test media item;
detect a second set of faces for a second image frame of the at least two image frames at the playback of the test media item;
determine an error rate for each image sensor of the set of image sensors based on a change between the detected first set of faces and the detected second set of faces; and
assign the weight to each image sensor of the set of image sensors based on the determined error rate for the pre-calibration of the set of image sensors.

9. The calibration system of claim 2, wherein
the control circuitry is further configured to pre-calibrate the set of biometric sensors of the plurality of different types of sensors before the playback of the media item, and
the set of biometric sensors is pre-calibrated based on a measurement of biometric data in a test environment in presence of a test audience at playback of a test media item.

10. The calibration system of claim 9,
wherein the control circuitry is further configured to:
determine a standard deviation in the measured biometric data of the test audience at the playback of the test media item;
determine a difference in the measured biometric data of each user of the test audience based on the determined standard deviation; and
assign the weight to each biometric sensor of the set of biometric sensors based on the determined difference,
for the pre-calibration of the set of biometric sensors.

11. The calibration system of claim 1, wherein
the control circuitry is further configured to receive a plurality of different types of input signals from the plurality of different types of sensors for the audience,
the plurality of different types of input signals is received at the playback of the media item, and the plurality of different types of input signals corresponds to the emotional response data of the audience.

12. The calibration system of claim 11, wherein the control circuitry is further configured to determine a peak emotional response level for each user of the audience based on the received plurality of different types of input signals.

13. The calibration system of claim 12, wherein the control circuitry is further configured to normalize the received plurality of different types of input signals based on the determined peak emotional response level and a geographical region of the audience.

14. The calibration system of claim 13, wherein the control circuitry is further configured to:
synchronize the normalized plurality of different types of input signals; and
overlay the normalized plurality of different types of input signals in a timeline that is same as a playback timeline of the media item.

15. The calibration system of claim 14, wherein
the control circuitry is further configured to generate an amalgamated audience response signal based on the synchronized plurality of different types of input signals and a plurality of weights assigned to the plurality of different types of sensors, and
the plurality of different types of sensors is configured to capture the plurality of different types of input signals.

16. The calibration system of claim 14, wherein the control circuitry is further configured to identify a set of common positive peaks and a set of common negative peaks in each of the plurality of different types of input signals based on the overlay of the normalized plurality of different types of input signals.

17. The calibration system of claim 16, wherein the control circuitry is further configured to calculate a first plurality of highlight points and a first plurality of lowlight points for a plurality of scenes of the media item based on the identified set of common positive peaks and the identified set of common negative peaks.

18. The calibration system of claim 17, wherein the control circuitry is further configured to compute the reaction delay based on the geographical region of the audience, a type of reaction from the audience, a type of scene of the media item, and a type of expected response from the audience.

19. The calibration system of claim 17, wherein
the transmission delay is computed based on the position of the first marker of a plurality of markers that are embedded in the media item.

20. The calibration system of claim 19, wherein the control circuitry is further configured to shift a first timestamp of a highlight point of the first plurality of highlight points to a second timestamp based on the computed reaction delay and the computed transmission delay.

21. The calibration system of claim 19, wherein the control circuitry is further configured to shift a first timestamp of a lowlight point of the first plurality of lowlight points to a second timestamp based on the computed reaction delay and the computed transmission delay.

22. The calibration system of claim 19, wherein
the control circuitry is further configured to predict a second plurality of highlight points and a second plurality of lowlight points in the media item based on a change in control parameters,
the change in the control parameters is associated with a simulation engine, and
the control parameters include a genre of the media item, the geographical region of the audience, a race of the audience, an age group of the audience, and a gender of the audience.

23. The calibration system of claim 19, wherein the control circuitry is further configured to:
generate a video score for the media item, an audio score for the media item, and a distribution score for the media item, wherein the generation is based on a simulation engine, the captured emotion response data, and a plurality of accuracy scores of the plurality of different types of sensors; and
compare a first media item with a second media based on the simulation engine, the video score, the audio score, and the distribution score.

24. A calibration method for media content, the method comprising:
in a calibration system comprising a memory, a media device, a plurality of different types of sensors, and control circuitry:
storing, in the memory, a media item and expected-emotions-tagging metadata for the media item, wherein the expected-emotions-tagging metadata indicates an associative relationship between a set of time slots for playback of the media item and a set of specified emotional states that are expected from an audience at the set of time slots during the playback of the media item;
embedding, by the control circuitry, a marker in the media item played by the media device, wherein
the marker is embedded based on the expected-emotions-tagging metadata, and
the marker corresponds to a time period, within a first time slot of the set of time slots, that includes a start time of a specified emotional state of the set of specified emotional states and an end time of the specified emotional state;
computing, by the control circuitry, a reaction delay for a emotional response of the audience based on a position of the marker, wherein
the emotional response is captured by the plurality of different types of sensors for a first scene of the media item, and
the marker spans in the first time slot that corresponds to the scene;
computing, by the control circuitry, a transmission delay for the emotional response at the playback of the scene of the media item, wherein the transmission delay is associated with at least one of a capture of emotional response data from the plurality of different types of sensors or a transmission of the emotional response data from the plurality of different types of sensors; and
calibrating, by the control circuitry, the position of the marker to associate a set of frames of the scene with the emotional response, based on the computed reaction delay and the computed transmission delay.

* * * * *